United States Patent
Shikama et al.

[11] Patent Number: 5,982,538
[45] Date of Patent: Nov. 9, 1999

[54] STEREOSCOPIC IMAGE PROJECTION APPARATUS AND TELECENTRIC ZOOM LENS

[75] Inventors: Shinsuke Shikama, Kyoto; Daisuke Umeno, Nagasaki, both of Japan

[73] Assignee: Mitsubishi Denki Kabushiki Kaisha, Tokyo, Japan

[21] Appl. No.: 08/837,507

[22] Filed: Apr. 3, 1997

Related U.S. Application Data

[63] Continuation of application No. 08/378,559, Jan. 25, 1995, abandoned.

[30] Foreign Application Priority Data

Jan. 28, 1994 [JP] Japan .................................. 6-008846
Mar. 30, 1994 [JP] Japan .................................. 6-086051

[51] Int. Cl.⁶ .......................... G02B 27/26; G03B 21/00; H04N 9/47; G02F 1/133
[52] U.S. Cl. .......................... 359/465; 359/464; 359/462; 353/7; 353/8; 349/15; 348/57; 348/58
[58] Field of Search .................................. 359/464, 465, 359/63, 64, 65; 353/7, 8, 31, 33; 348/51, 52, 57, 58; 349/15

[56] References Cited

U.S. PATENT DOCUMENTS

| | | | |
|---|---|---|---|
| 3,858,001 | 12/1974 | Bonne | 359/465 |
| 4,582,396 | 4/1986 | Bos et al. | 359/73 |
| 4,850,685 | 7/1989 | Kamakura et al. | 359/40 |
| 4,981,352 | 1/1991 | Tejima et al. | 359/40 |
| 4,995,718 | 2/1991 | Jachimowicz | 353/31 |
| 5,073,013 | 12/1991 | Sonehara et al. | 359/63 |
| 5,113,285 | 5/1992 | Franklin et al. | 359/465 |
| 5,239,372 | 8/1993 | Lipton | 359/464 |

FOREIGN PATENT DOCUMENTS

| | | |
|---|---|---|
| 1-157688 | 6/1989 | Japan . |
| 3-63619 | 3/1991 | Japan . |
| 4-3046 | 1/1992 | Japan . |
| 4-172416 | 6/1992 | Japan . |

OTHER PUBLICATIONS

M. Imai et al "Stereoscopic Projection Display Using Liquid Crystal TV Panels" pp. 5–84.
"Display Tech, Inc. "—Jan. 1991.
"Meadowlar Optics" pp. 8–9.

*Primary Examiner*—Cassandra Spyrou
*Assistant Examiner*—Audrey Chang

[57] ABSTRACT

A stereoscopic image projector has a light valve controlled by two image signals. The light valve produces a polarized raster image in which some rasters are modulated by the first image signal and other rasters by the second image signal. A polarization switch changes the polarization of rasters modulated by the second image signal, thereby creating a stereoscopic image, which is projected through a projection lens onto a screen, and viewed through polarizing eyeglasses. A color stereoscopic image is obtained by using three light valves and three polarization switches, one for each of the three primary colors, and combining their images for projection through a single projection lens. The projection lens is preferably a telecentric zoom lens consisting of three lens groups.

23 Claims, 24 Drawing Sheets f =86.5mm f =138.4mm f =86.5mm

LONGITUDINAL SPHERICAL ABER.

FOCUS (MILLIMETERS)

ASTIGMATIC FIELD CURVES (DEG.)

FOCUS (MILLIMETERS)

DISTORTION (DEG.)

% DISTORTION f =138.4mm

LONGITUDINAL SPHERICAL ABER.

FOCUS (MILLIMETERS)

ASTIGMATIC FIELD CURVES (DEG.)

FOCUS (MILLIMETERS)

DISTORTION (DEG.)

% DISTORTION f =86.5mm

LONGITUDINAL
SPHERICAL ABER.

FOCUS (MILLIMETERS)

ASTIGMATIC
FIELD CURVES
(DEG.)

FOCUS (MILLIMETERS)

DISTORTION
(DEG.)

% DISTORTION f =138.4mm

LONGITUDINAL
SPHERICAL ABER.

FOCUS (MILLIMETERS)

ASTIGMATIC
FIELD CURVES
(DEG.)

FOCUS (MILLIMETERS)

DISTORTION
(DEG.)

% DISTORTION f =86.5mm

LONGITUDINAL
SPHERICAL ABER.

FOCUS (MILLIMETERS)

ASTIGMATIC
FIELD CURVES
(DEG.)

FOCUS (MILLIMETERS)

DISTORTION
(DEG.)

% DISTORTION f =138.4mm

LONGITUDINAL
SPHERICAL ABER.

FOCUS (MILLIMETERS)

ASTIGMATIC
FIELD CURVES
(DEG.)

FOCUS (MILLIMETERS)

DISTORTION
(DEG.)

% DISTORTION f =86.5mm

LONGITUDINAL SPHERICAL ABER.

ASTIGMATIC FIELD CURVES (DEG.)

DISTORTION (DEG.)

f =138.4mm

LONGITUDINAL SPHERICAL ABER.

ASTIGMATIC FIELD CURVES (DEG.)

DISTORTION (DEG.)

f =86.5mm

LONGITUDINAL SPHERICAL ABER.

FOCUS (MILLIMETERS)

ASTIGMATIC FIELD CURVES (DEG.)

FOCUS (MILLIMETERS)

DISTORTION (DEG.)

% DISTORTION f =138.4mm

LONGITUDINAL SPHERICAL ABER.

FOCUS (MILLIMETERS)

ASTIGMATIC FIELD CURVES (DEG.)

FOCUS (MILLIMETERS)

DISTORTION (DEG.)

% DISTORTION f =86.5mm

LONGITUDINAL SPHERICAL ABER.

ASTIGMATIC FIELD CURVES (DEG.)

DISTORTION (DEG.)

f =138.4mm

LONGITUDINAL SPHERICAL ABER.

ASTIGMATIC FIELD CURVES (DEG.)

DISTORTION (DEG.)

f =86.5mm

LONGITUDINAL SPHERICAL ABER.

ASTIGMATIC FIELD CURVES (DEG.)

DISTORTION (DEG.)

f =138.4mm

LONGITUDINAL SPHERICAL ABER.

ASTIGMATIC FIELD CURVES (DEG.)

DISTORTION (DEG.)

f =86.5mm

LONGITUDINAL SPHERICAL ABER.

FOCUS (MILLIMETERS)

ASTIGMATIC FIELD CURVES (DEG.)

FOCUS (MILLIMETERS)

DISTORTION (DEG.)

% DISTORTION f =138.4mm

LONGITUDINAL SPHERICAL ABER.

FOCUS (MILLIMETERS)

ASTIGMATIC FIELD CURVES (DEG.)

FOCUS (MILLIMETERS)

DISTORTION (DEG.)

% DISTORTION

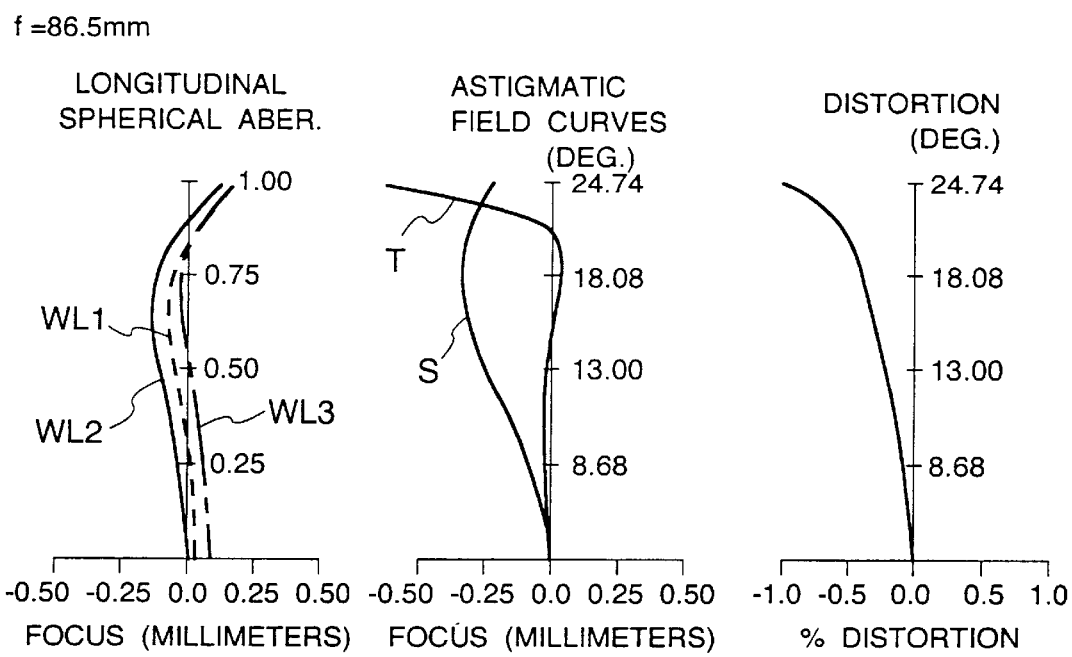
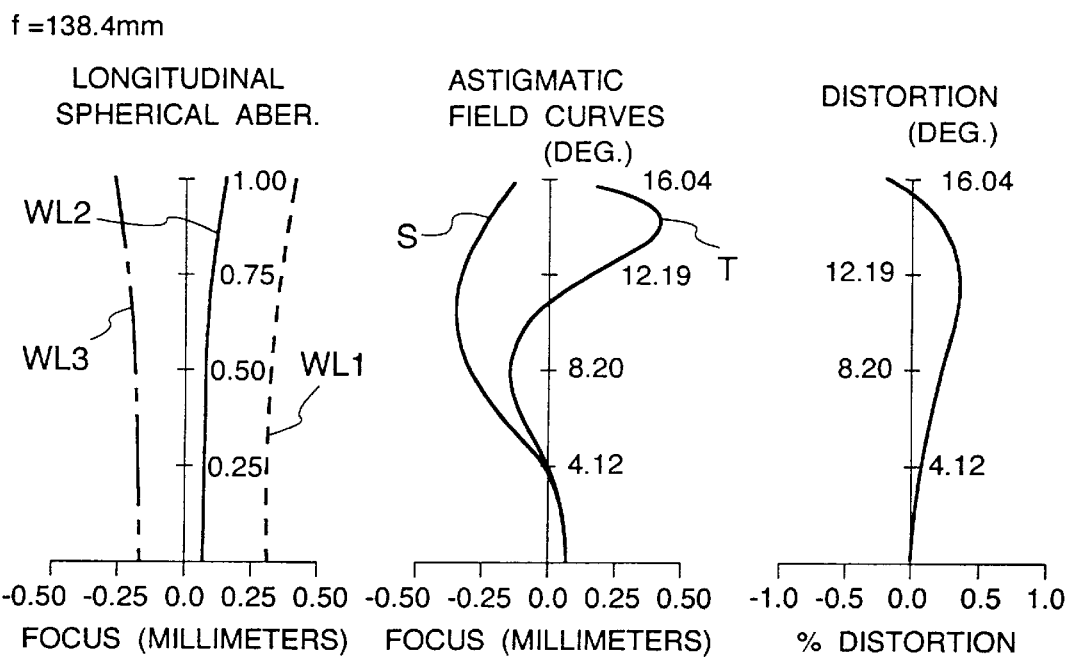

STEREOSCOPIC IMAGE PROJECTION APPARATUS AND TELECENTRIC ZOOM LENS

This application is a continuation of application Ser. No. 08/378,559 filed on Jan. 25, 1995, now abandoned.

BACKGROUND OF THE INVENTION

This invention relates to a stereoscopic image projection apparatus such as a color stereoscopic projection television set, and to a telecentric zoom lens for use in such apparatus.

Stereoscopic projection can be achieved by using light with one type of polarization to project an image for the left eye onto a screen, and light with another type of polarization to project an image for the right eye onto the same screen. The viewer wears eyeglasses that transmit light of the appropriate polarization to each eye, and thereby sees the image stereoscopically, as if it were three-dimensional.

A convenient way to project a polarized image is to employ a projector comprising a liquid-crystal panel and a projection lens. One prior-art color stereoscopic projection apparatus employs six such projectors, three for the three primary colors in the left-eye image, and three more for the three primary colors in the right-eye image. With this type of apparatus, however, aside from the problems of size, weight, and cost occasioned by having six projectors, there is the problem of image registration: the six images must be accurately positioned with respect to one another on the screen. This makes the apparatus difficult to set up and adjust.

Another prior-art stereoscopic color projection apparatus avoids these problems by employing two color liquid-crystal panels, one forming the left-eye image and the other forming the right-eye image, and combining the two color images by means of a polarizing beam splitter (functioning as a beam combiner) for projection through a single lens. With this type of apparatus, however, new problems arise. A color liquid-crystal panel employs red, green, and blue filters to produce the three primary colors, but these filters necessarily absorb at least two-thirds of the light: hence the projected image lacks adequate brightness. Moreover, only one-third of the pixels are available for each color: hence the projected image lacks adequate resolution.

Further problems relate to the projection lens. For a variety of reasons, which will be explained in the detailed description of the invention, a telecentric zoom lens is desirable, but such lenses are scarcely to be found in the prior art. Conventional zoom lenses suitable for use in projection display apparatus of the present type generally comprise four or five lens groups, making the structure of the lens barrel complex. They also require cam-driven compensators to maintain correct focus at different magnifications.

SUMMARY OF THE INVENTION

It is accordingly an object of the present invention to project a bright stereoscopic image, with high resolution.

Another object of the invention is to provide a stereoscopic image projection apparatus that is easy to assemble and set up.

Still another object is to assure reliable, flicker-free operation.

Yet another object is to prevent cross-talk between left-eye and right-eye images.

A further object is to provide a telecentric zoom lens suitable for use in image projection apparatus.

Another object is to simplify focus and zoom adjustment in a telecentric zoom lens.

Yet another object is to control optical aberration.

The invented stereoscopic image projection apparatus has a light source for emitting light toward a light valve, which is controlled by a first image signal and a second image signal. The light valve polarizes and modulates the incident light to create a polarized raster image in which some rasters are modulated by the first image signal and other rasters are modulated by the second image signal. This raster image is passed through a polarization switch, which changes the polarization of rasters modulated by the second image signal, thereby creating a stereoscopic image. The stereoscopic image is projected through a projection lens onto a screen, and viewed through polarizing eyeglasses.

To obtain a color image, the apparatus employs three light valves and three polarization switches as described above. A color separator separates the light from the light source into three primary colors, which are distributed to the three light valves to create a stereoscopic image in each of the primary colors. The three stereoscopic images are then combined into a single image and projected through the projection lens.

The projection lens is preferably a telecentric zoom lens consisting of three lens groups, the second lens group being movably mounted between the first and third lens groups. The first and third lens groups have positive refracting power, while the second lens group has negative refracting power.

BRIEF DESCRIPTION OF THE DRAWINGS

FIG. 28A illustrates spherical aberration in an eleventh telecentric zoom lens at the extreme short-focus position.

FIG. 28B illustrates astigmatism in the eleventh telecentric zoom lens at the extreme short-focus position.

FIG. 28C illustrates distortion in the eleventh telecentric zoom lens at the extreme short-focus position.

FIG. 28D illustrates spherical aberration in the eleventh telecentric zoom lens at the extreme long-focus position.

FIG. 28E illustrates astigmatism in the eleventh telecentric zoom lens at the extreme long-focus position.

FIG. 28F illustrates distortion in the eleventh telecentric zoom lens at the extreme long-focus position.

DETAILED DESCRIPTION OF THE INVENTION

Embodiments of the invention will be described with reference to the attached illustrative drawings.

Figure 1:
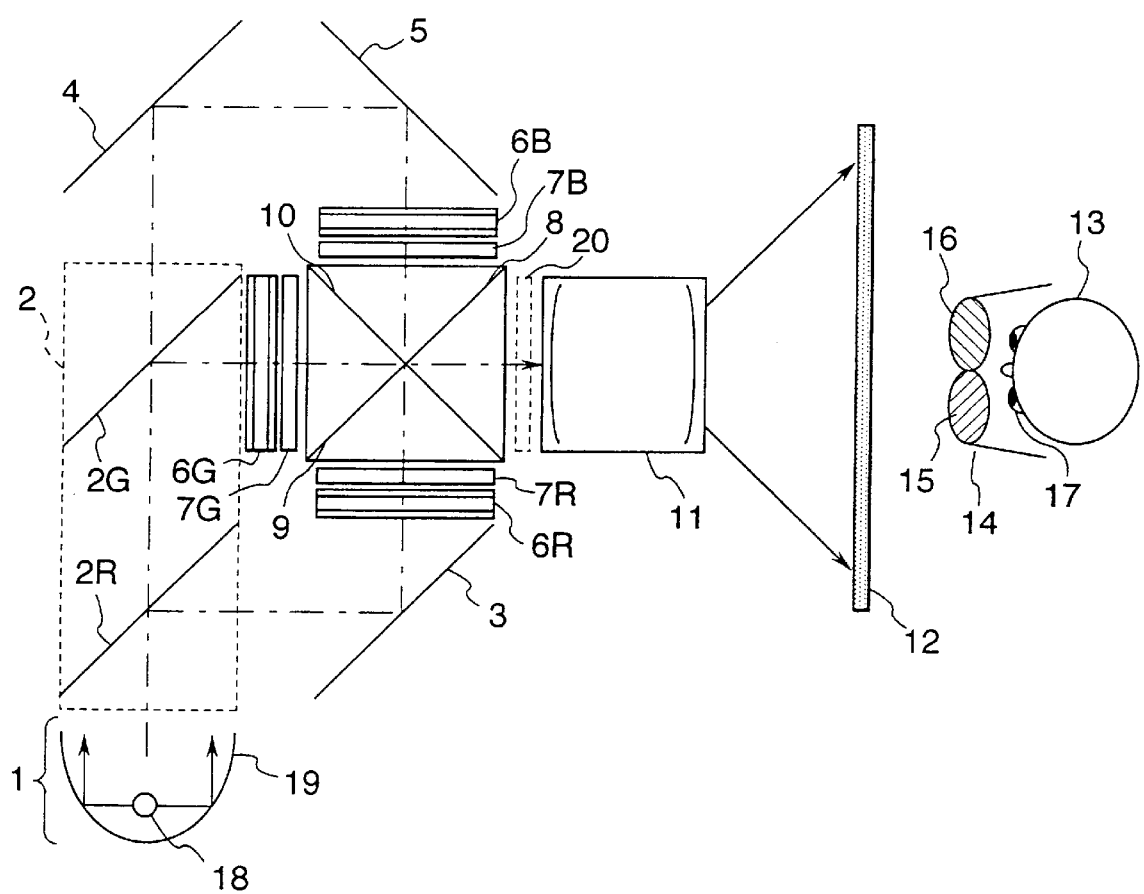
FIG. 1 is a plan sectional view of a novel color stereoscopic image projection apparatus.

As a first embodiment of the invention, FIG. 1 diagrammatically shows a novel projection apparatus for displaying an enlarged stereoscopic color image. In this apparatus, a light source 1 emits white light into a color separator 2 comprising a red-reflecting dichroic mirror 2R and a green-reflecting dichroic mirror 2G. Dichroic mirrors which reflect light of one color while transmitting light of other colors with low loss can be made by employing multilayer dielectric coatings. Mirrors 2R and 2G and additional mirrors 3, 4, and 5 are disposed so that light of the three primary colors red, green, and blue is directed toward respective light valves 6R, 6G, and 6B.

In this first embodiment, each of these light valves 6R, 6G, and 6B modulates the intensity of the received light so as to create a raster image. Modulation is controlled by a first image signal, which produces an image to be seen by one eye, and a second image signal, which produces an image to be seen by the other eye. Some rasters in the image are modulated by the first image signal and other rasters by the second image signal. In addition to being modulated, light that passes through the light valves 6R, 6G, and 6B is linearly polarized. All three light valves 6R, 6G, and 6B polarize light in the same way; for example, the light emerging from each light valve 6R, 6G, and 6B may be linearly polarized in the horizontal plane.

The three raster images created by the three light valves 6R, 6G and 6B are received by corresponding polarization switches 7R, 7G, and 7B. Each polarization switch changes the polarization of those rasters that were modulated by the second image signal. For example, the plane of polarization of these rasters may be changed from horizontal to vertical. The result is a stereoscopic image comprising a left-eye image and a right-eye image that are differently polarized. Three such stereoscopic images are produced, one in each of the three primary colors.

These three stereoscopic images are combined by a dichroic prism 8 that reflects red light in a first plane 9, reflects blue light in a second plane 10, and transmits green light without reflection. The dichroic prism 8 has the form of a rectangular prism with the red and blue light valves 6R and 6B disposed on two opposite sides, and the green light valve 6G on a third side. The first and second planes 9 and 10 are oriented at right angles to each other and at forty-five-degree angles to the incoming red and blue light. Like the dichroic mirrors 2R and 2G, the dichroic prism 8 operates with low loss. The three stereoscopic images in the three primary colors are combined into a single, bright, color stereoscopic image which is directed into a projection lens 11 and projected onto a screen 12.

The dichroic prism 8 is preferably square, so that the optical length from the projection lens 11 to each of the three light valves 6R, 6G, and 6B is the same. This optical length is referred to as the back focal distance of the projection lens 11.

The screen 12 is seen by a viewer 13 wearing polarizing eyeglasses 14 in which the two lenses are polarizers that transmit differently polarized light. For example, the left lens 15 transmits vertically polarized light while the right lens 16 transmits horizontally polarized light. Each eye 17 accordingly sees only the intended part of the total image, with the result that the viewer 13 perceives a stereoscopic image, giving a three-dimensional effect.

The light source 1 preferably comprises a lamp 18 such as a metal halide lamp, xenon lamp, or halogen lamp disposed at the focus of a parabolic reflector 19, so that parallel light rays are emitted toward the color separator 2. Light paths in FIG. 1 are indicated by dot-dash lines up to the projection lens 11, and by solid lines between the projection lens 11 and screen 12.

Also indicated in FIG. 1 is a quarter-wave plate 20 which may be inserted between the dichroic prism 8 and projection lens 11 to alter the polarization of the left- and right-eye images from linear polarization to circular polarization. This quarter-wave plate 20 will be described in a later embodiment and should be considered to be absent in the first embodiment.

FIG. 1 shows a screen of the transmission type, with the projection lens 11 on one side and the viewer 13 on the other. However, the invention can also be practiced with a screen of the reflecting type, with the viewer 13 and projection lens 11 on the same side.

Figure 2:
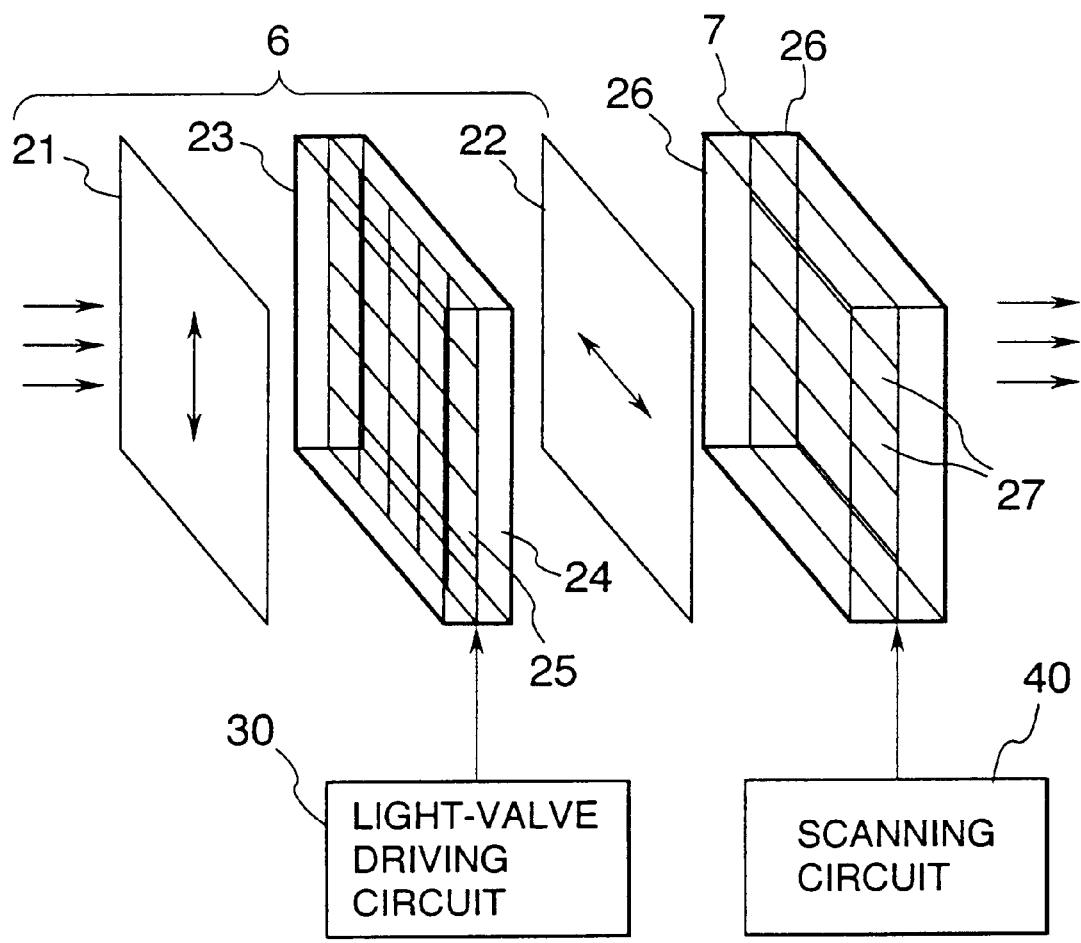
FIG. 2 illustrates a light valve and polarization switch in FIG. 1.

FIG. 2 shows the structure of a light valve 6 and its corresponding polarization switch 7. All three of the light valves 6R, 6G, and 6B and polarization switches 7R, 7G, and 7B in FIG. 1 have the structure shown in FIG. 2.

The light valve 6 in FIG. 2 is a liquid-crystal panel comprising a pair of crossed polarizers 21 and 22, between which is disposed a twisted nematic liquid-crystal cell 23. Polarizer 22 is also referred to as the analyzer.

The twisted nematic liquid-crystal cell 23 is a well-known device comprising, for example, a nematic liquid crystal confined between two transparent plates 24, on the inner surface of at least one of which is formed a matrix of transparent electrodes extending in the horizontal and vertical directions. To improve contrast, the matrix is preferably an active matrix, with thin-film transistors provided at the intersections of the horizontal and vertical electrodes. The horizontal electrodes 25 define rasters in the image. The vertical electrodes modulate individual pixels in the rasters.

The polarization switch 7 is also a liquid-crystal cell, comprising a liquid crystal confined between transparent plates 26, on at least one of which is formed a pattern of horizontal electrodes 27. These electrodes 27 are formed in positions matching the positions of the horizontal electrodes 25 of the light valve 6, thus corresponding to the rasters in the raster image, and control polarization switching on a raster-by-raster basis. Several types of polarization switch that may be employed will be described in more detail later.

The light valve 6 is electrically driven by a light-valve driving circuit 30. The polarization switch 7 is driven by a scanning circuit 40.

Figure 3:
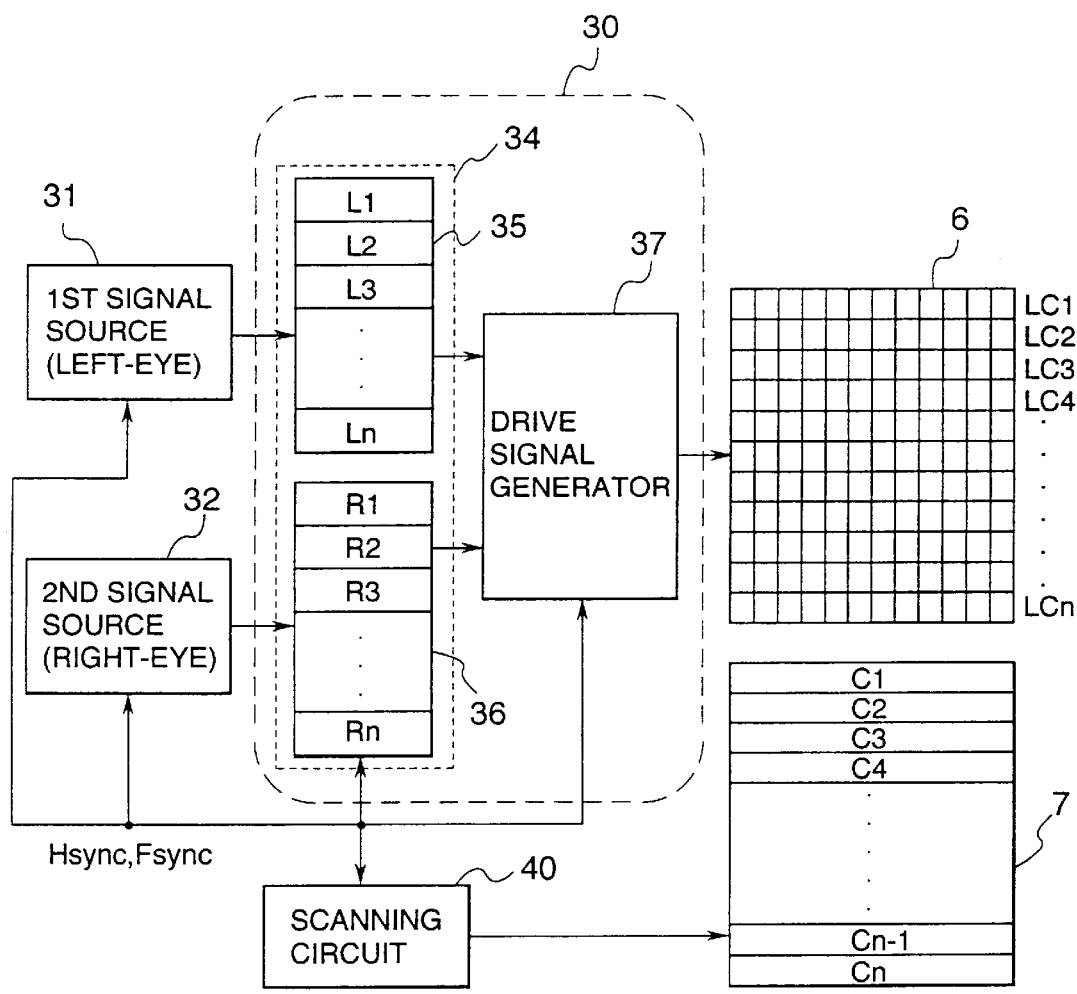
FIG. 3 illustrates the driving circuits of the light valve and polarization switch.

Referring to FIG. 3, the light-valve driving circuit 30 receives the first image signal from a first signal source 31, and the second image signal from a second signal source 32, and stores them in a memory 34 comprising a first frame memory 35 and a second frame memory 36. In the figure, the first frame memory 35 stores a left-eye image comprising image rasters L1, . . . , Ln. The second frame memory 36 stores a right-eye image comprising image rasters R1, . . . , Rn. Image rasters are read out of these frame memories 35 and 36 into a drive signal generator 37, which converts them to signals to drive the horizontal and vertical electrodes of the light valve 6. The horizontal electrodes 25 (indicated as LC1, . . . , LCn) are driven cyclically from top to bottom.

The horizontal electrodes 27 in the polarization switch 7 (indicated as C1, . . . , Cn) are driven in the same cycle by the scanning circuit 40. Operations of the signal sources 31 and 32, light-valve driving circuit 30, and scanning circuit 40 are synchronized by a horizontal synchronizing signal Hsync comprising one pulse per raster, and a field synchronizing signal Fsync comprising two pulses per frame (one pulse per field).

Figure 4:
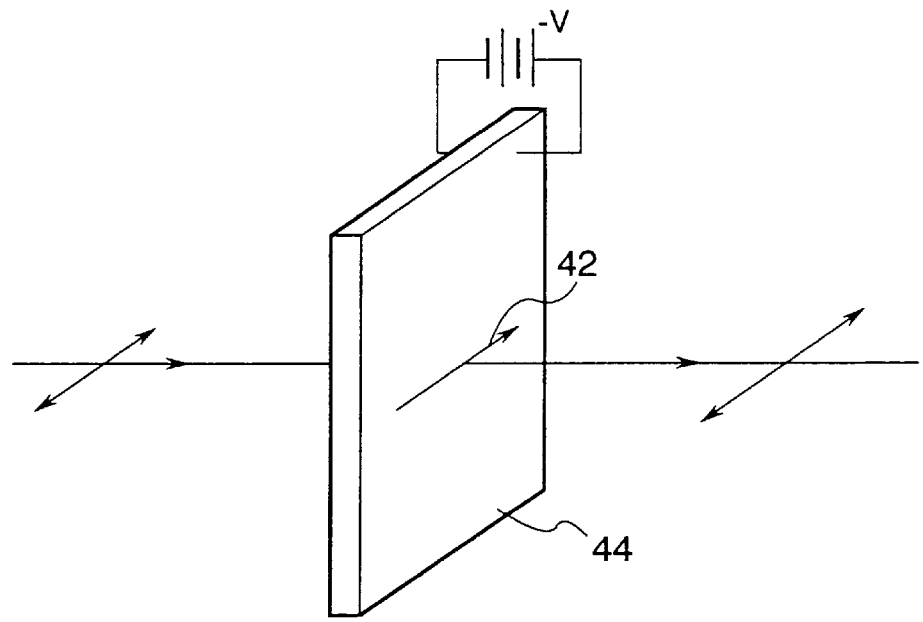
FIG. 4 illustrates a ferroelectric liquid-crystal cell with negative applied voltage.
Figure 5:
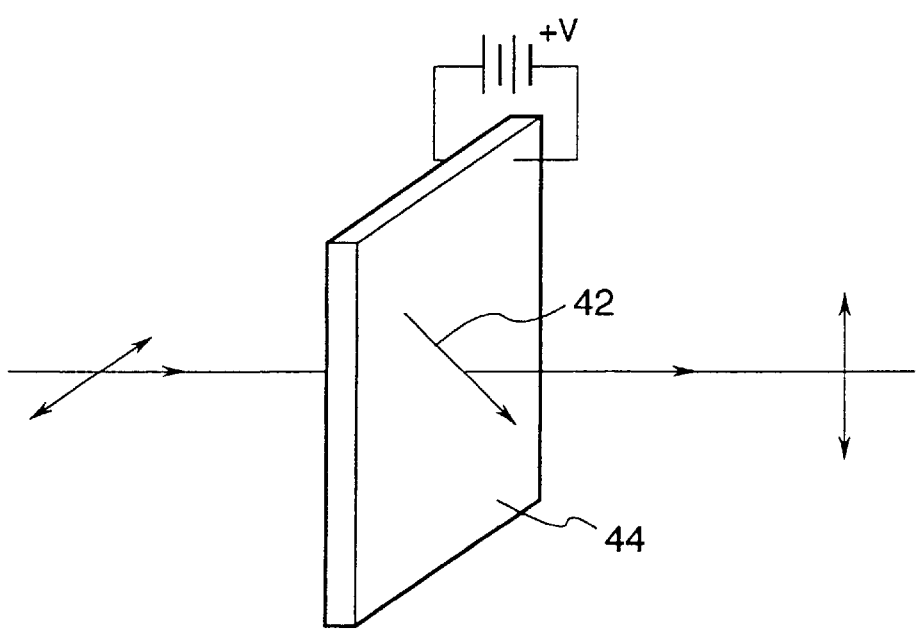
FIG. 5 illustrates a ferroelectric liquid-crystal cell with positive applied voltage.

One type of liquid-crystal cell that may be used as the polarization switch 7 comprises a ferroelectric liquid crystal, the principal of operation of which is shown in FIGS. 4 and 5. These drawings show only a small section of the polarization switch 7, disposed within one raster. A ferroelectric liquid crystal is a single-axis birefringent material, the optical axis of which is parallel to the average axial direction of the liquid crystal molecules. When a negative voltage is applied as in FIG. 4, the director 42 of the ferroelectric liquid crystal 44 is oriented horizontally, so that horizontally polarized incident light is transmitted with its plane of polarization unchanged. When a positive voltage is applied as in FIG. 5, the director 42 is rotated through a forty-five-degree angle. Given the proper thickness, the ferroelectric liquid crystal 44 now acts as a half-wave plate, causing the plane of polarization of the transmitted light to change from horizontal to vertical.

Ferroelectric liquid crystals have a fast response, typically switching states in less than 100 microseconds. This fast response creates a stereoscopic image with good contrast.

Figure 6:
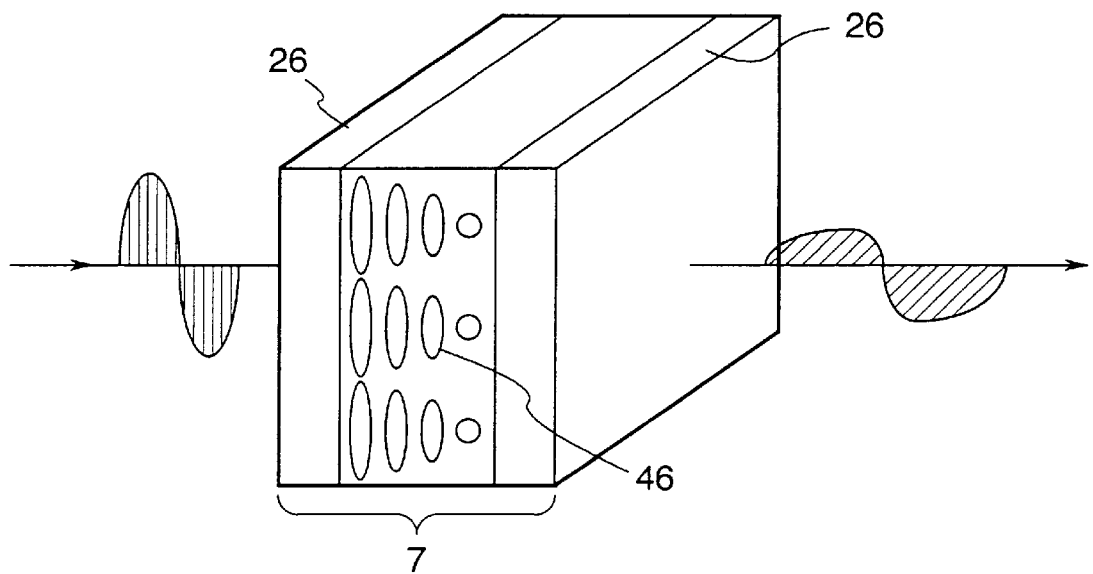
FIG. 6 illustrates a twisted nematic liquid-crystal cell with zero applied voltage.
Figure 7:
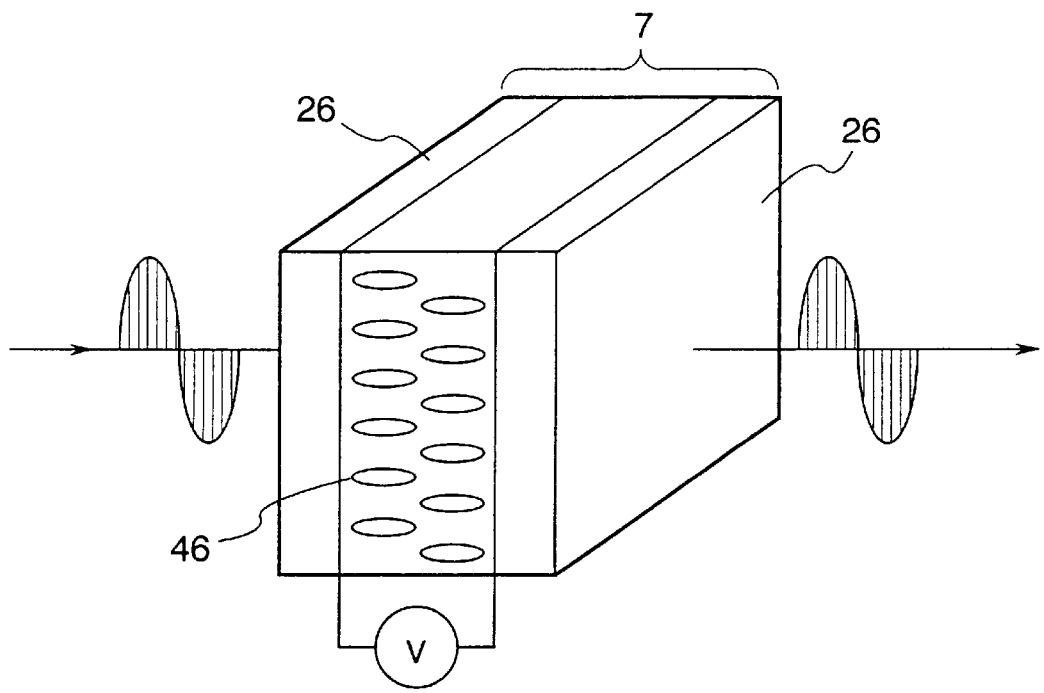
FIG. 7 illustrates a twisted nematic liquid-crystal cell with non-zero applied voltage.

Another type of liquid-crystal cell that may be used as the polarization switch 7 is a twisted nematic cell, similar to the one employed in the light valve 6. Referring to FIG. 6, when no voltage is applied, the nematic liquid crystal 46 confined between the transparent plates 26 is twisted, and the plane of polarization of transmitted light is rotated through a right angle. Referring to FIG. 7, when a voltage is applied, the nematic liquid crystal 46 becomes aligned to the normal direction of the substrates so that light is transmitted through with no change in its plane of polarization.

Use of twisted nematic liquid crystal cells for both the light valve 6 and polarization switch 7 has the advantage that both can be fabricated by the same steps, thereby reducing the cost of the projection apparatus. The cost saving can be increased if a telecentric projection lens (described later) is employed, for then substantially identical liquid crystal cells, with identical horizontal electrode configurations, can be used in the light valve 6 and polarization switch 7.

Yet another possible type of polarization switch employs a liquid-crystal optical retarder, which uses the birefringence of a nematic liquid crystal to provide a variable phase shift responsive to an applied voltage. In the present projection apparatus, it suffices to switch the phase shift between zero and $\lambda/2$, where $\lambda$ is the wavelength of the incident light. An optical retarder of this type is generally similar to FIG. 6 and FIG. 7, so a separate drawing will be omitted.

All of the polarization switches described above operate reliably because they are switched electrically, with no moving mechanical parts. Any other type of electro-optic polarization switch, such as any device that provides an electrically controllable phase shift, can be used with similar effect, provided that it permits control of individual rasters.

Operation of the invented color stereoscopic image projection apparatus will now be described with reference to FIGS. 1 to 9.

Referring to FIG. 3, one frame (one complete image) of the first image signal is received and stored in the first frame memory 35, while one frame of the second image signal is received and stored in the second frame memory 36. A frame consists of two fields. In the first field, the drive signal generator 37 reads odd-numbered rasters from the first frame memory 35 and even-numbered rasters from the second frame memory 36. In the second field, even-numbered rasters are read from the first frame memory 35 and odd-numbered rasters from the second frame memory 36.

In each field, the drive signal generator 37 drives the horizontal electrodes 25 in the light valve 6 in sequence from LC1 to LCn, and the scanning circuit 40 drives the horizontal electrodes 27 in the polarization switch 7 in sequence from C1 to Cn. The light valve 6 outputs an intensity-modulated raster image with uniform polarization, e.g. Linear polarization in the horizontal plane. The image is formed in an object plane disposed between the transparent plates 24 of the liquid crystal cell 23. The object plane is substantially coincident with the plane of the electrodes 25.

Figure 8:
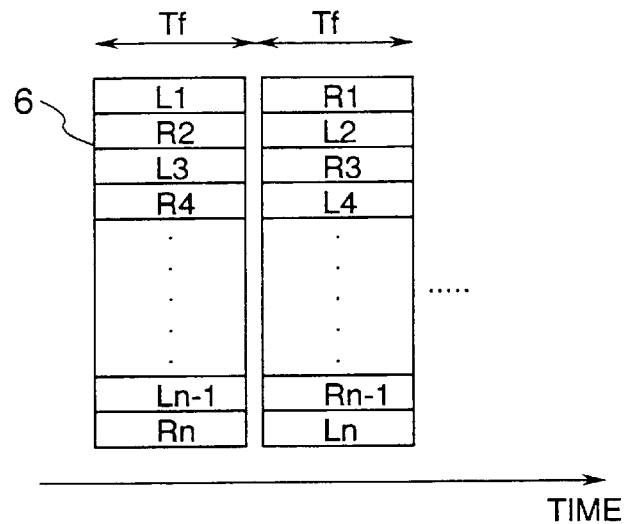
FIG. 8 illustrates the scanning of two consecutive fields.

FIG. 8 shows the scanning sequence in two consecutive fields, using the symbol Tf to represent the duration of one field. In the first field, the first left-eye raster L1 is read, followed by the second right-eye raster R2, then the third left-eye raster L3, and so on. In the second field, the first right-eye raster R1 is read, followed by the second left-eye raster L2, then the third right-eye raster R3, and so on. Accordingly, each raster alternates between display of left-eye and right-eye images in successive fields. Moreover, in each field, the left-eye and right-eye images are interlaced so that they appear alternately on successive rasters. The above mentioned alternative data arrangement for left eye and right eye is processed by the drive signal generator 37 and written into the horizontal electrodes 25 of the light valve 6.

Figure 9:
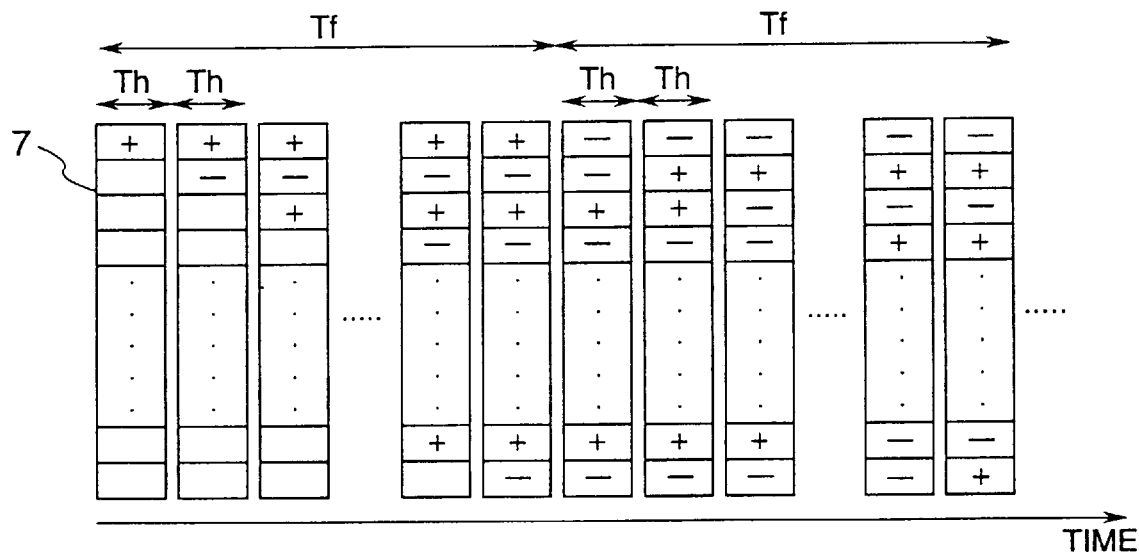
FIG. 9 illustrates the scanning of two consecutive fields in more detail.

FIG. 9 shows how the polarization switch 7 operates during two successive fields, using Tf to represent the field duration and Th to represent the duration of one horizontal raster scan. The polarization switch 7 is assumed to be of the type illustrated in FIGS. 4 and 5. A plus sign (+) is used to represent a positive voltage applied to a horizontal electrode 27, and a minus sign (−) to represent a negative voltage.

In the first field, when the first raster (L1) is scanned, a positive voltage is applied to the first horizontal electrode. In the second raster scan (R2), this voltage is maintained while a negative voltage is applied to the next horizontal electrode. In the third raster scan (L3), these voltages are maintained while a positive voltage is applied to the third horizontal electrode. At the end of the field, the horizontal electrodes alternate between positive and negative voltages, matching the alternation between left-eye and right-eye images in the rasters. Odd-numbered rasters, carrying left-eye image components, are switched to a vertical plane of polarization, while even-numbered rasters, carrying right-eye image components, are left with a horizontal plane of polarization.

In the next field, in the first horizontal scan, when right-eye raster (R1) is read, the voltage applied to the first horizontal electrode in the polarization switch 7 changes from positive to negative. In the next horizontal scan, when left-eye raster (L2) is being read, the voltage applied to the second horizontal electrode changes from negative to positive. This pattern of switching continues to the end of the field; as each new raster is scanned, its polarization is switched so that left-eye rasters continue to exit the polarization switch 7 with vertical polarization and right-eye rasters with horizontal polarization.

The above operations are carried out in synchronization in the three light valves 6R, 6G, and 6B and three polarization switches 7R, 7G, and 7B, producing three monochromatic images in respective primary colors red, green, and blue. These images have identical patterns of alternating left- and right-eye rasters and alternating vertical and horizontal planes of polarization. When these three images are combined by the dichroic prism 8, they accordingly meld into a single color stereoscopic image, alternating between left-eye rasters with vertical polarization and right-eye rasters with horizontal polarization. When projected onto the screen 12 by the projection lens 11 and viewed through the polarizing eyeglasses 14, the image appears three-dimensional.

An advantage of having right-eye rasters interlaced with left-eye rasters is that the screen does not flicker; that is, it does not jump back and forth between display of a complete left-eye image and display of a complete right-eye image. The shifting of the left- and right-eye images between even- and odd-numbered rasters is substantially imperceptible.

The projected image is bright, because the three primary colors are separated and combined by using low-loss dichroic optical elements instead of filters. Resolution is high, because the full resolution provided by the light valves is obtained for each of the primary colors individually. Setup, adjustment, and focusing are easy because the image is projected through a single projection lens 11. With fast-responding polarization switches, the switching between left-eye and right-eye images is carried out cleanly, with little cross-talk between the two images, and image contrast is good.

The image signals supplied to the light-valve driving circuit 30 may be supplied with interlaced scanning (all odd rasters, followed by all even rasters) or progressive scanning (all rasters in order from top to bottom). This affects the sequence in which the rasters are stored in the first and second frame memories 35 and 36, but not the sequence in which the rasters are read out of the frame memories.

If the polarization switches 7R, 7G, and 7B are of the twisted nematic type shown in FIGS. 6 and 7, the operation is the same except that the voltages applied to their horizontal electrodes 27 alternate between zero volts and a non-zero voltage.

Next a second embodiment will be described.

This second embodiment is identical to the first, except that a quarter-wave plate 20, indicated by dotted lines in FIG. 1, is inserted between the dichroic prism 8 and projection lens 11. The vertical and horizontal linear polarization of the left-eye and right-eye images are accordingly changed to left and right circular polarization. The optic axis of the quarter-wave plate 20 should be oriented at an angle of forty-five degrees to the planes of polarization of the light exiting the dichroic prism 8. The left and right lenses 15 and 16 of the polarizing eyeglasses 14 worn by the viewer 13 should be of the corresponding circular polarizing types.

The second embodiment operates in the same way as the first, except for the difference between circular and linear polarization in the projected stereoscopic image. A detailed description will be omitted. An advantage of using circular polarization is the avoidance of cross-talk when the viewer's head is tilted to the left or right.

This second embodiment can be varied by inserting a separate quarter-wave plate between each of the polarization switches 7R, 7G, and 7B and the dichroic prism 8. This arrangement is preferable in that the phase shift of each quarter-wave plate can be optimized for the principal wavelength of the transmitted primary color, resulting in improved color rendition.

Figure 10:
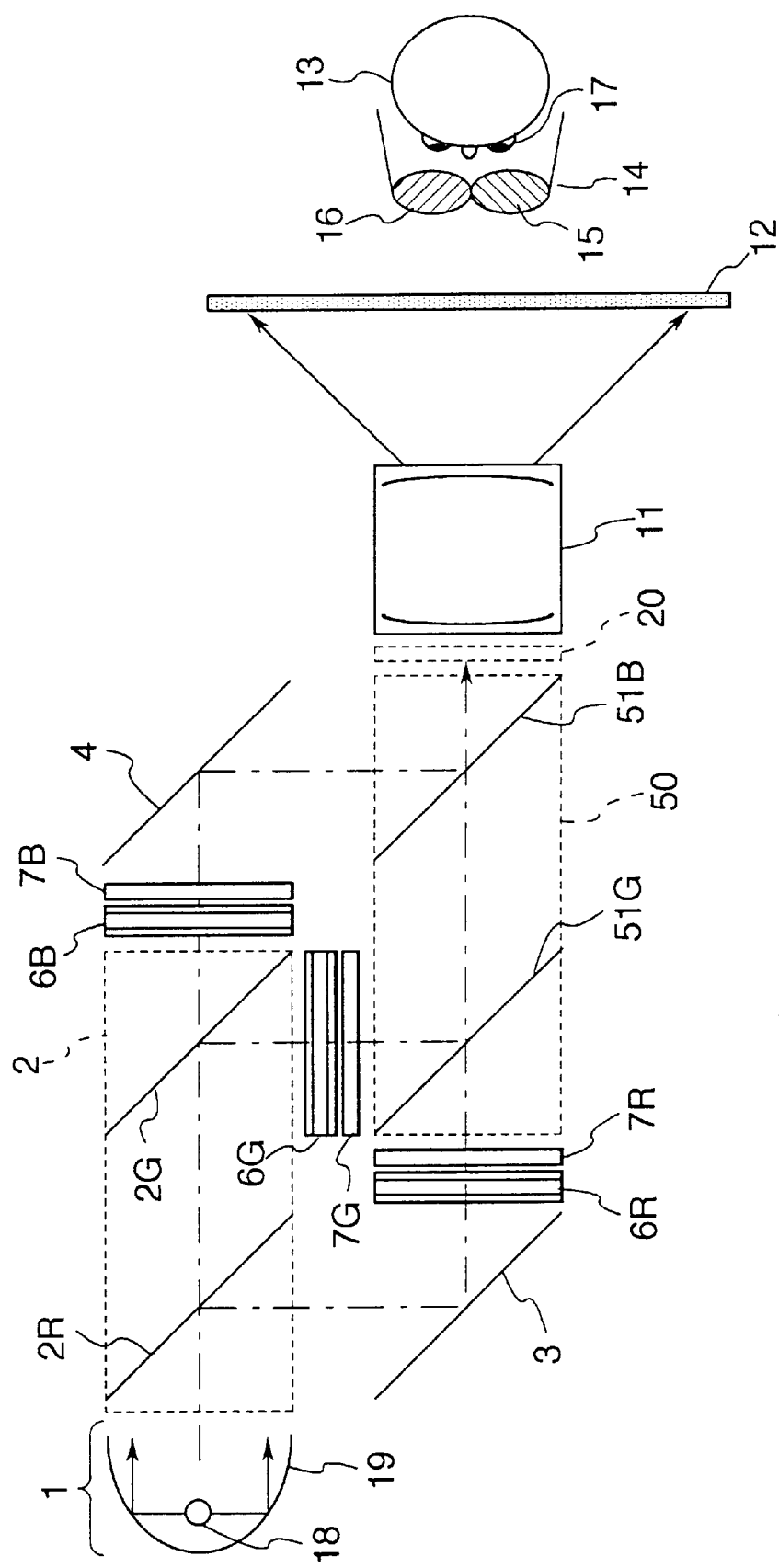
FIG. 10 is a plan sectional view of another novel color stereoscopic image projection apparatus.

FIG. 10 illustrates a third embodiment, in which the three raster images in the three primary colors are combined by a color combiner 50 comprising a green-reflecting dichroic mirror 51G and blue-reflecting dichroic mirror 21B. This color combiner 50 is similar in concept to the color separator 2 in FIG. 1, and fulfills the same function as the dichroic prism 8 in FIG. 1. As in FIG. 1, a quarter-wave plate 20 may be inserted, in front of the projection lens 11 for example, to obtain circular polarization.

In FIG. 10, the red light valve 6R and its polarization switch 7R are disposed between mirrors 3 and 51G, the green light valve 6G and its polarization switch 7G are disposed between mirrors 2G and 51G, and the blue light valve 6B and its polarization switch 7B are disposed between mirrors 2G and 4. The reason for this arrangement is to position each light valve at the same optical length (the back focal distance) from the projection lens 11.

Figure 11:
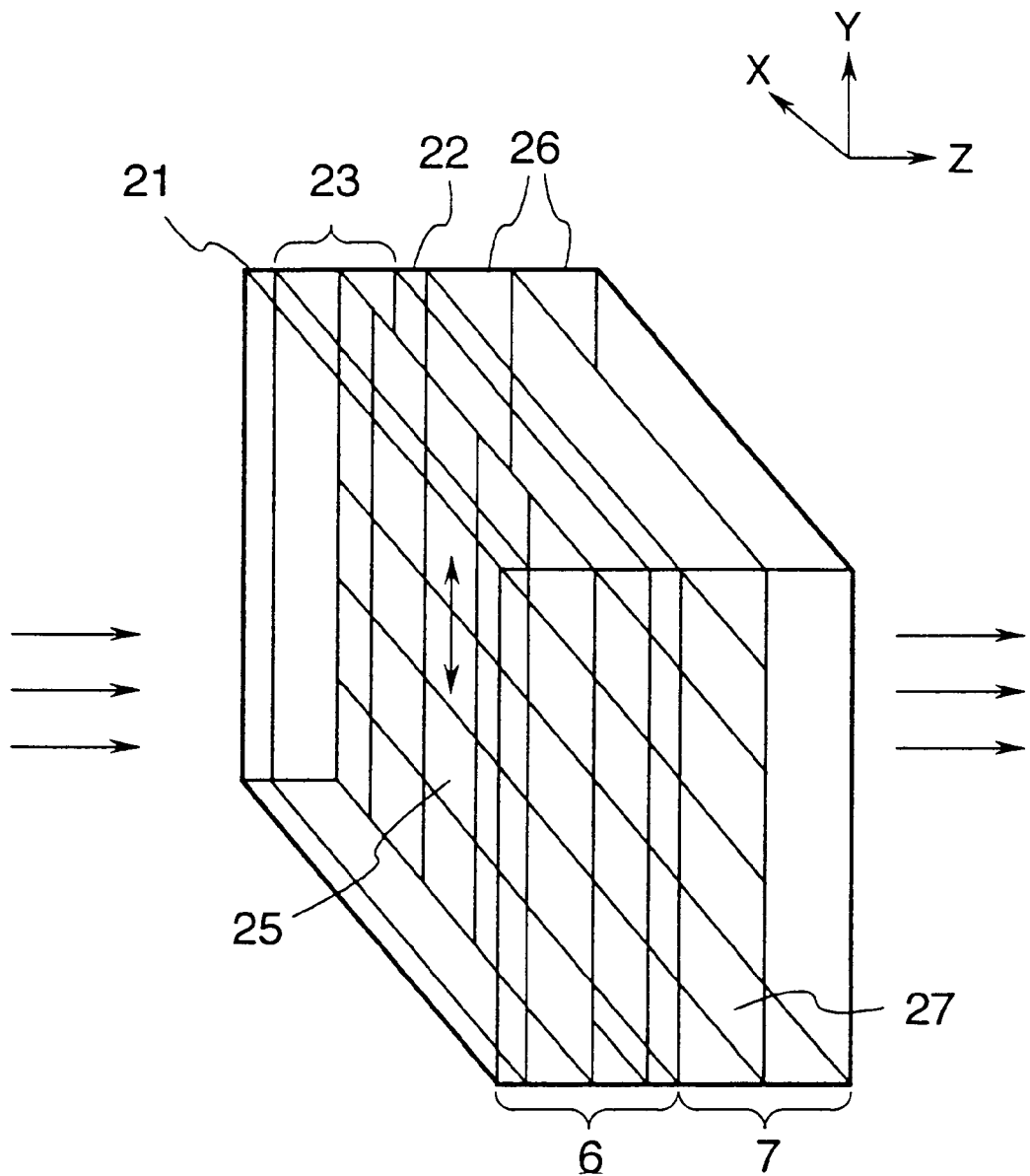
FIG. 11 illustrates a light valve and polarization switch assembled as a single unit.

Although the tight valves and polarization switches have been described as separate elements, each pair of them can be fabricated as a single unit, as shown in FIG. 11. The same reference numerals are used in FIG. 11 as in FIG. 2. The second polarizer 22 (the analyzer) of the light valve 6 is now disposed in contact with one of the two transparent plates 26 that confine the liquid crystal of the polarization switch 7. The light valve 6 and polarization switch 7 thus form a unitary structure.

This arrangement facilitates subsequent assembly of the stereoscopic projector, by ensuring the alignment of the horizontal electrodes 25 of the light valve 6 with the horizontal electrodes 27 of the polarization switch 7. Having the polarization switch 7 disposed as close as possible to the light valve 6 also reduces cross-talk between the left-eye and right-eye images, by minimizing the amount of defocusing at the plane of the horizontal electrodes 27 in the polarization switch 7 when the image formed at the object plane in the light valve 6 is brought to a sharp focus on the screen.

The first polarizer 21 does not participate in image formation, so it can be disposed at a certain distance from the liquid-crystal cell 23 in FIG. 11, to afford better cooling, without impairing optical performance.

Figure 12:
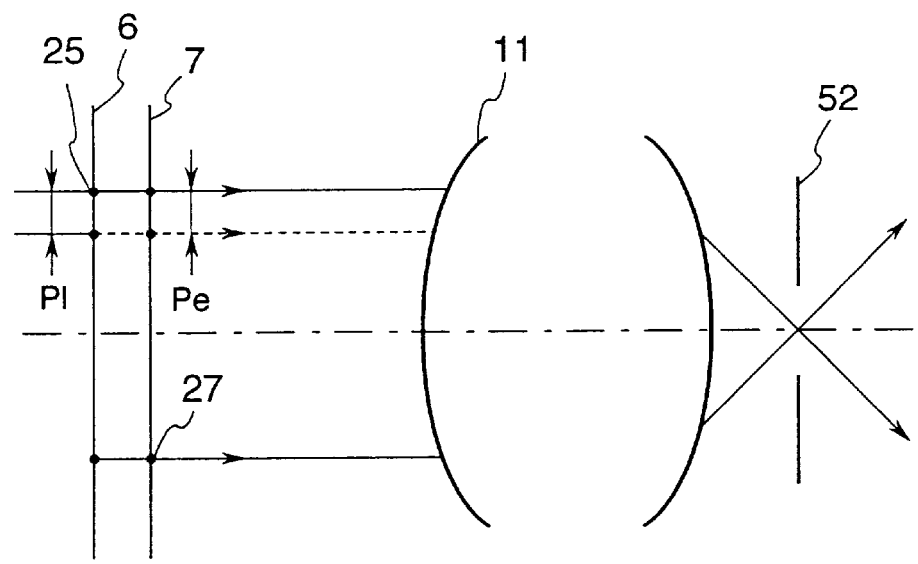
FIG. 12 illustrates electrode alignment in the light valve and polarization switch, for a telecentric projection lens.

FIG. 12 diagrammatically illustrates the electrode alignment for the case of a telecentric projection lens 11. The light valve 6 and polarization switch 7 are indicated by vertical lines, with dots representing the positions of their horizontal electrodes 25 and 27. The electrode pitch in the light valve 6 is represented by the symbol Pl, and the electrode pitch in the polarization switch 7 by the symbol Pe.

The aperture stop 52 of a telecentric projection lens 11 is disposed near a focal point of the lens, so that light rays entering the projection lens 11 parallel to its optic axis are directed through the aperture stop 52 and onto the screen (not shown). The image projected on the screen is therefore derived from rays exiting the light valve 6 parallel to the optic axis. The electrode pitches Pl and Pe are accordingly equal. Each horizontal electrode 25 in the light valve 6 is aligned with its corresponding electrode 27 in the polarization switch 7 in a plane parallel to the optic axis of the projection lens 11.

Although FIG. 12 shows the aperture stop 52 disposed in front of the projection lens 11, the projection lens 11 may have additional lens elements (not shown) on the other side of the aperture stop 52. These have been omitted from FIG. 12 to more clearly illustrate the telecentric concept.

Figure 13:
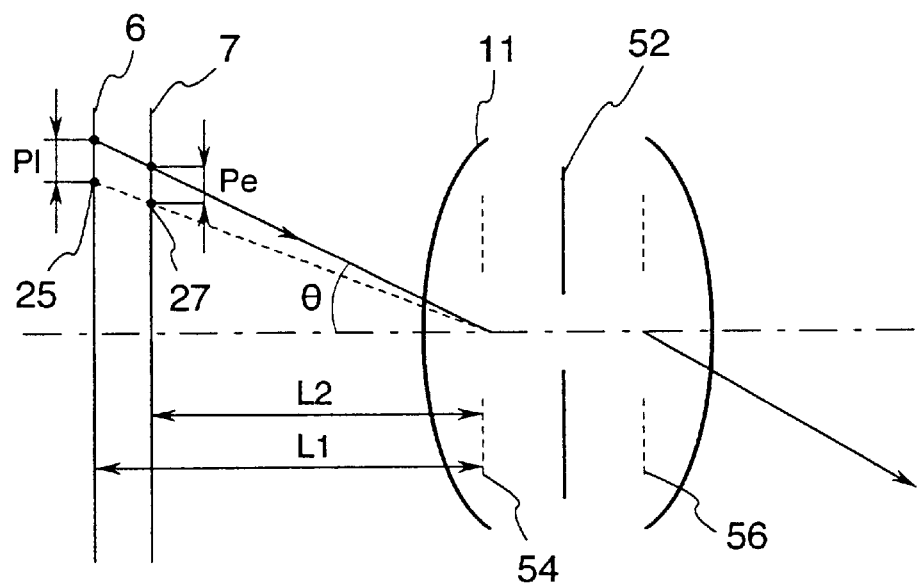
FIG. 13 illustrates electrode alignment for a non-telecentric projection lens.

FIG. 13 illustrates the electrode alignment for a non-telecentric projection lens 11, in which images of the aperture stop 52 are formed at an entrance pupil 54 and exit pupil 56. The image projected on the screen now derives from rays entering the entrance pupil 54 at an angle θ. The electrode pitches Pl and Pe should therefore satisfy the relation $$Pl/Pe = L1/L2$$

where L1 is the distance from the entrance pupil 54 to the light valve 6, and L2 is the distance from the entrance pupil 54 to the polarization switch 7. If this relation is satisfied, the projected image will be substantially free of cross-talk.

A comparison of FIGS. 12 and 13 makes it apparent that use of a telecentric projection lens 11 facilitates alignment of the light valve 6 with the polarization switch 7, whether these are fabricated separately as in FIG. 2 or as a single unit as in FIG. 11. Moreover, the spectral characteristics of dichroic prisms and mirrors depend strongly on the angle of incidence, so a telecentric lens, which allows the angle of incidence to be the same for all rasters, results in better color rendition. It also reduces cross-talk in that, since the image-forming rays enter the lens parallel to the optic axis, the object plane in the light valve and the electrode plane in the polarization switch can be in focus simultaneously.

The optical distance from the projection lens 11 to the screen 12 in apparatus such as a projection television set is generally not very great, so the projection lens 11 needs to have a comparatively short focal length, to provide a wide projection angle. A further desired property is that the projection lens 11 be a zoom lens, so that the magnification can be changed easily. To permit use of high-resolution light valves with densely spaced pixels, the projection lens 11 also requires high resolving power, and of course distortion and chromatic aberration of magnification must be well controlled.

Figure 14:
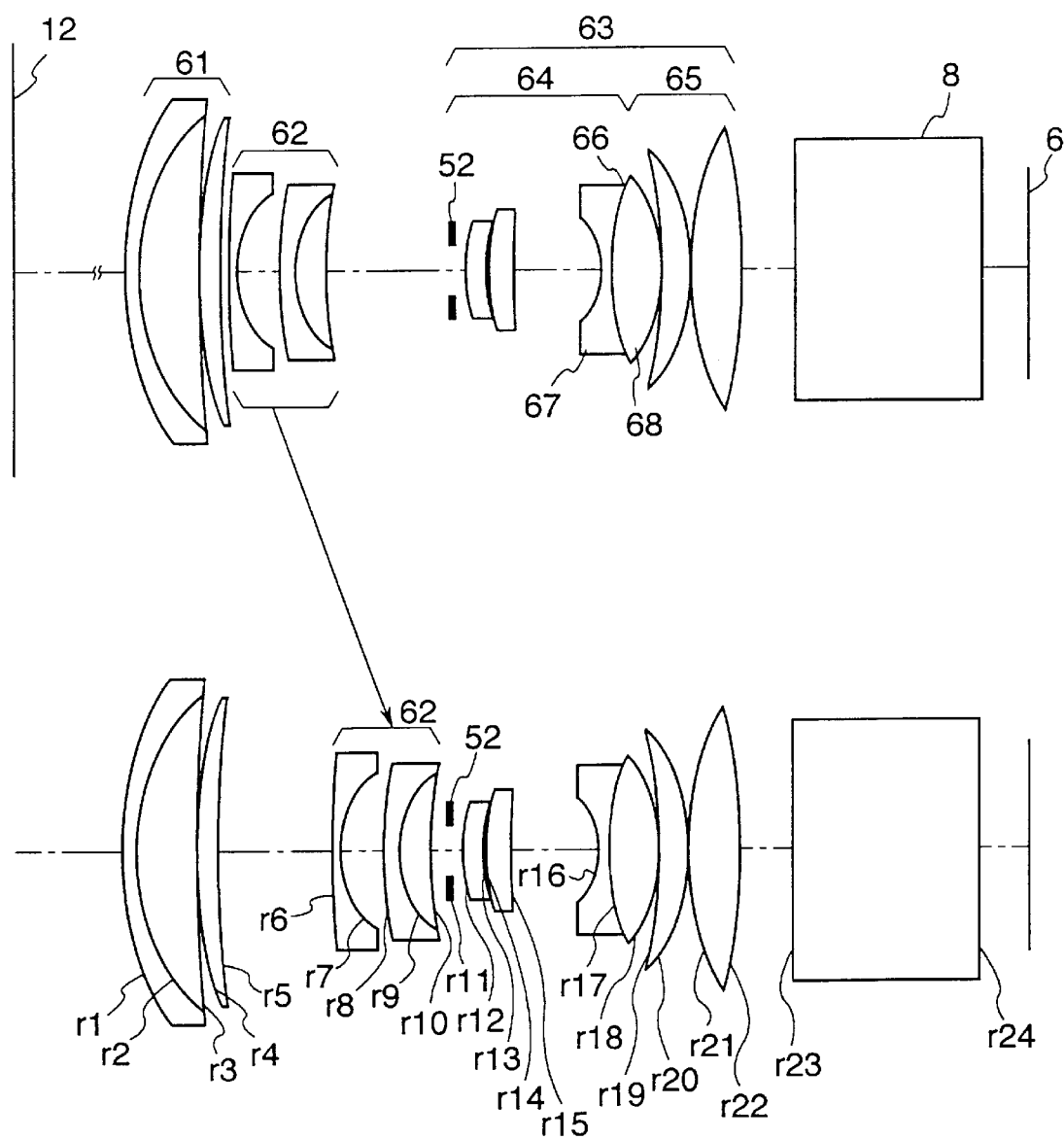
FIG. 14 is a sectional view of a novel telecentric zoom lens configuration, sample aberration characteristics for which are shown in FIGS. 15A to 18F.

FIG. 14 is a diagrammatic sectional drawing of a novel telecentric zoom lens that satisfies the above requisites. The lens is shown positioned between the dichroic prism 8 and screen 12 of FIG. 1, with a light valve 6 also represented by a line to indicate the location of the object plane. For purposes of the following discussion, the dichroic prism 8 can be considered to be a transparent parallel plate representing all the optical elements between the object plane of the light valve 6 and the telecentric zoom lens; thus it may also represent the color combiner 50 of FIG. 10.

The side of the lens toward the screen 12 will be referred to as the screen side, and the side toward the light valve 6 as the object-plane side. Since the screen and object plane are at conjugate locations and the object plane is normally closer to the telecentric zoom lens, the screen side can also be described as the long conjugate side, and the object-plane side as the short conjugate side.

The telecentric zoom lens in FIG. 14 is a compound lens comprising, in order from the screen side, a first lens group 61, a second lens group 62, and a third lens group 63. The third lens group 63 consists of, in order from the screen side, a fourth lens group 64 and a fifth lens group 65. The aperture stop 52 is disposed between the second and third lens groups 62 and 63, near the paraxial focus of the third lens group 63.

The third lens group 63 includes a cemented surface 66 consisting of a bi-concave lens 67 on the screen side and a bi-convex lens 68 on the object-plane side. The cemented surface 69 between these two lenses 67 and 68 is the boundary between the fourth lens group 64 and fifth lens group 65.

The first and third lens groups 61 and 63 are mounted at a fixed distance from one another. Both of these lens groups 61 and 63 have positive refractive power; that is, they have positive focal lengths, (the refractive power being the reciprocal of the focal length). Within the third lens group 63, the fourth lens group 64 has negative refractive power (negative focal length) and the fifth lens group has positive refractive power. The third lens group 63 is accordingly of the inverted telephoto type.

The second lens group 62 is movably mounted between the first and third lens groups, and has negative refractive power (negative focal length). FIG. 14 shows the second lens group 62 at two positions: an extreme short-focus position near the first lens group 61, which provides the telecentric zoom lens with its minimum focal length; and an extreme long-focus position near the third lens group 63, which provides the telecentric zoom lens with its maximum focal length. Zoom is achieved by moving the second lens group 62 between these two positions, as indicated by the arrow.

If zoom results in loss of focus, correct focus can be restored by moving the telecentric zoom lens as a whole. The lens barrel accordingly has a simple structure. The compensators, cams, and other complex contrivances of the prior art can be dispensed with.

The notation listed in Table 1 will be used in further description of the novel telecentric zoom lens.

TABLE 1

| Symbol | Meaning |
|---|---|
| | Notation |
| f | Focal length of telecentric zoom lens as a whole |
| F | Effective F-number at standard magnification M, on object-plane side |
| ω | Projection angle (full-field angle) |
| M | Magnification |
| $f_1$ | Focal length of first lens group 61 |
| $f_2$ | Focal length of second lens group 62 |
| f | Focal length of third lens group 63 |
| $f_{31}$ | Focal length of fourth lens group 64 |
| $f_{32}$ | Focal length of fifth lens group 65 |
| $f_w$ | Focal length of telecentric zoom lens as a whole at extreme short-focus position |
| $L_{23w}$ | Distance between second and third lens groups 62 and 63 at extreme short-focus position |
| Δ | Distance from paraxial focus of third lens group 63 to aperture stop 52 (on screen side) |
| m | Surface number, in order from screen side |
| ri | Radius of curvature of i-th surface |
| di | Distance from i-th surface to (i + 1)-th surface (thickness of i-th lens element or air gap) |
| a | Gap between first and second lens groups 61 and 62 |
| b | Gap between second lens group 62 and aperture stop 52 |
| ni | Refractive index of i-th lens element at 587.6-nm wavelength (d-line) |
| nF | Refractive index of bi-concave lens 67 |
| nB | Refractive index of bi-convex lens 68 |
| ν i | Abbe's number of i-th lens element |
| AST | Aperture stop |
| PLATE | Parallel plate (e.g. dichroic prism 8) |

Note: Focal lengths and magnification values are given for the e-line wavelength of 546.1 nm.

In the invented telecentric zoom lens, the focal lengths $f_1$, $f_2$ and $f_3$ of the first, second, and third lens groups 61, 62, and 63 satisfy the following conditions with respect to the focal length $f_w$ of the telecentric zoom lens as a whole when zoomed to the extreme short-focus position:

$$1.6 < f_1/f_w < 2.8 \quad (1)$$

$$-1.4 < f_2/f_w < -0.6 \quad (2)$$

$$0.9 < f_3/f_w < 1.5 \quad (3)$$

The focal length $f_w$ and the distance $L_{23w}$ between the second and third lens groups 62 and 63 at the extreme short-focus position also satisfy the following condition:

$$0.4 < L_{23w}/f_w < 0.8 \quad (4)$$

If the upper limit in condition (1) were exceeded, the overall length of the telecentric zoom lens and the diameter of its first lens group 61 would become excessive, and the lens would be inordinately expensive. If the lower limit were exceeded, the first lens group 61 would generate large optical aberrations that would be difficult to correct.

If the upper limit in condition (2) were exceeded, the negative-power lenses in the second lens group would have short radii of curvature, and the second lens group 62 would generate excessive aberrations that would be difficult to correct. If the lower limit were exceeded, the second lens group 62 would have to move too far to achieve a given change of magnification, and the telecentric zoom lens as a whole would become too long.

If the upper limit in condition (3) were exceeded, the telecentric zoom lens would become too long. If the lower limit were exceeded, the third lens group 63 would generate excessive aberrations that would be difficult to correct.

The purposes of condition (4) are to control optical aberration, in combination with conditions (1) to (3), and to keep the lens from being too long. If the upper limit were exceeded, the lens as a whole would become too long, large, and expensive. If the lower limit were exceeded, the lens would be short, but would produce aberrations which would be difficult to correct.

To assure good telecentricity, it is desirable to place an upper limit on the displacement $\Delta$ of the aperture stop 52 from the paraxial focus of the third lens group 63 on the screen side, more precisely on the ratio of this displacement $\Delta$ to the focal length $f_3$ of the third lens group 63. This condition assures that image-forming rays from peripheral parts of the object plane (off-axis rays) will be substantially parallel to the optic axis. The appropriate condition is:

$$|\Delta/f_3| < 0.15 \quad (5)$$

A further desirable condition related to telecentricity concerns the focal lengths $f_{31}$ and $f_{32}$ of the fourth and fifth lens groups 64 and 65:

$$-30 < f_{31}/f_{32} < -4 \quad (6)$$

If the upper limit in this condition (6) is exceeded, the strong negative refractive power of the fourth lens group 64 creates difficulties in positioning the aperture stop 52, as well as causing optical aberration. If the lower limit is exceeded, the inverted telephoto effect of the third lens group 63 is weakened, the aperture stop 52 must be disposed at too great a distance from the third lens group 63, and the telecentric zoom lens as a whole becomes too long.

It is also desirable that the surface 66 at which the fourth lens group 64 meets the fifth lens group 65 have negative refractive power. Accordingly, the refractive indexes nF and nB of the bi-concave lens 67 and bi-convex lens 68 preferably satisfy the following inequality:

$$nF > nB \quad (7)$$

Eleven telecentric zoom lenses will be described below with reference to Tables 2 to 12 and FIGS. 14 to 28F. All of these telecentric zoom lenses have the structure described above and satisfy conditions (1) to (7). Reference numerals 61 to 68 in FIGS. 19, 21, and 25 have the same meaning as in FIG. 14.

Tables 2 to 5 list the lens parameters of four telecentric zoom lenses embodying the configuration of FIG. 14. The tables identify each surface by a number m from 1 to 24 and give the radius of curvature ri of the surface, in millimeters. In FIG. 14, these surfaces are identified by corresponding symbols from r1 to r24. Similar notation will be used in FIGS. 19, 21, and 25. The aperture stop 52 is regarded as a single surface r11. The front and back surfaces r23 and r24 of the parallel-plate elements 8 are also listed, although they are not, strictly speaking, part of the telecentric zoom lens.

Tables 2 to 12 also specify the thickness di, in millimeters, of the lens element or air gap on the object-plane side of each surface, using the symbol "a" to represent the variable gap between the first and second lens groups 61 and 62, and the symbol "b" for the variable gap between the second lens group 62 and aperture stop 52. For lens elements, the tables further specify the refractive index ni and Abbe's number vi.

Each table begins with a summary of focal-length information (in millimeters) and other information relevant to lens performance and to conditions (1) to (6). This includes the values of "a" and "b" at the extreme short-focus and long-focus positions, and the corresponding projection angles and magnifications.

Figure 15A:
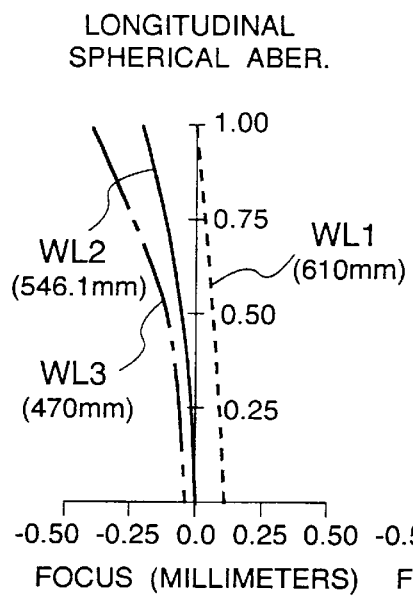
FIG. 15A illustrates spherical aberration in a first telecentric zoom lens at the extreme short-focus position.

FIG. 15A shows spherical aberration characteristics for the first telecentric zoom lens, described in Table 2, as seen from the object-plane side when the second lens group 62 is at the extreme short-focus position (f=86.5 mm). Three curves are shown, representing the following red, green, and blue wavelengths:

WL1: 610 nm (red)

WL2: 546.1 nm (green)

WL3: 470 nm (blue)

Figure 15B:
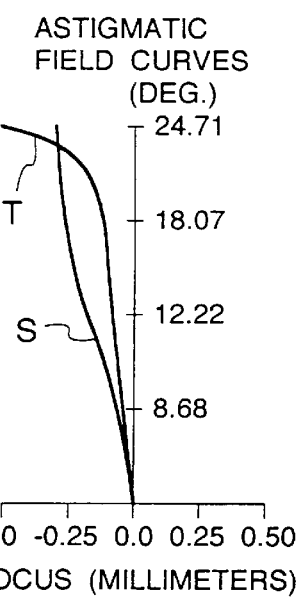
FIG. 15B illustrates astigmatism in the first telecentric zoom lens at the extreme short-focus position.

FIG. 15B shows astigmatic field characteristics for the first telecentric zoom lens, again from the object-plane side at the extreme short-focus position. The symbols T and S represent the meridional and sagittal planes, respectively.

Figure 15C:
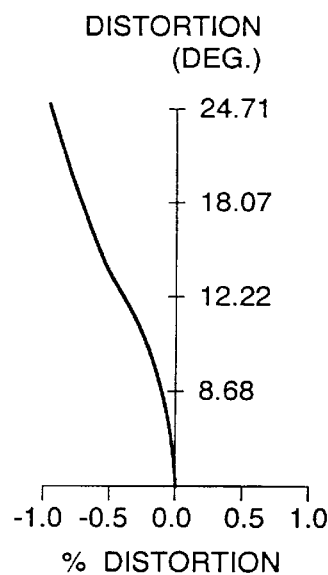
FIG. 15C illustrates distortion in the first telecentric zoom lens at the extreme short-focus position.

FIG. 15C shows a distortion characteristic for the first telecentric zoom lens at the e-line (green) wavelength of 546.1 nm. This characteristic is also as seen from the object-plane side at the extreme short-focus position.

Figure 15D:
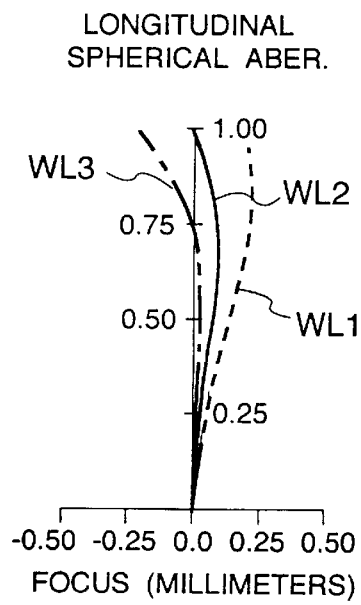
FIG. 15D illustrates spherical aberration in the first telecentric zoom lens at the extreme long-focus position.
Figure 15E:
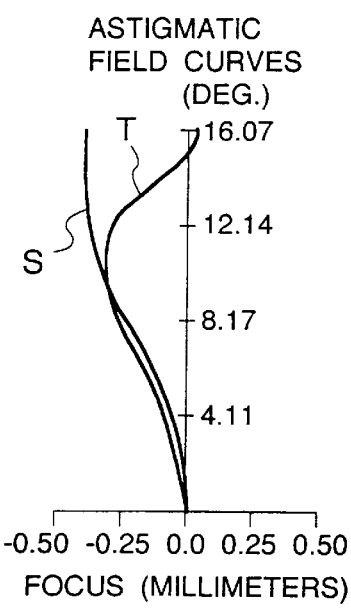
FIG. 15E illustrates astigmatism in the first telecentric zoom lens at the extreme long-focus position.
Figure 15F:
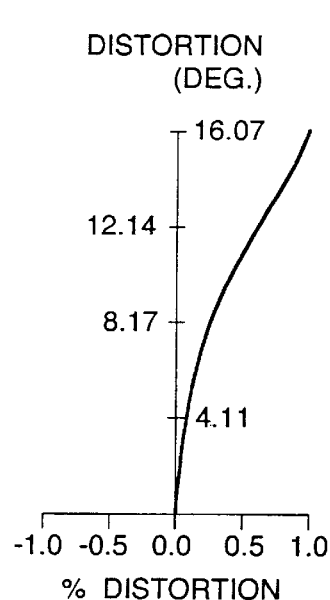
FIG. 15F illustrates distortion in the first telecentric zoom lens at the extreme long-focus position.
Figure 16A:
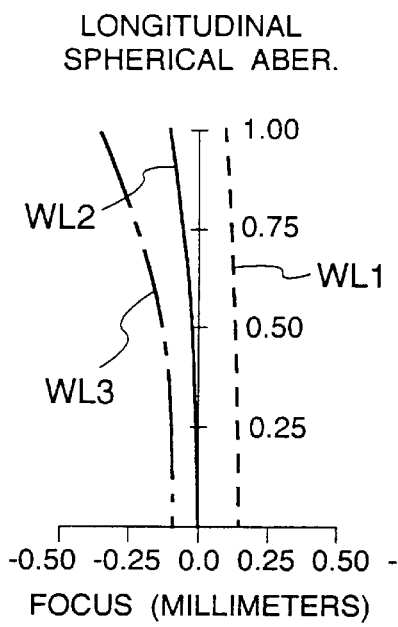
FIG. 16A illustrates spherical aberration in a second telecentric zoom lens at the extreme short-focus position.
Figure 16B:
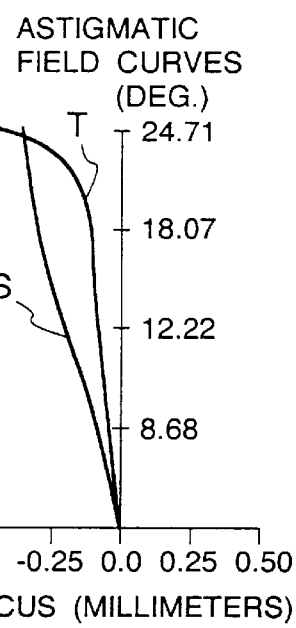
FIG. 16B illustrates astigmatism in the second telecentric zoom lens at the extreme short-focus position.
Figure 16C:
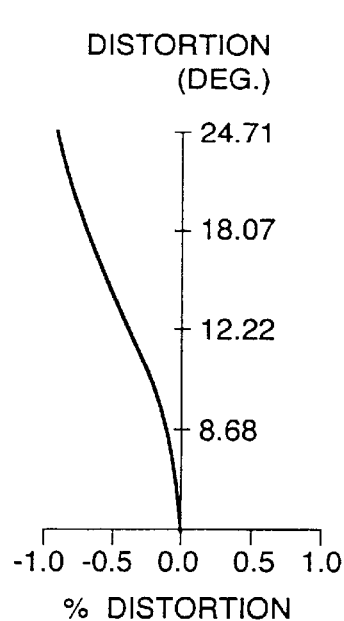
FIG. 16C illustrates distortion in the second telecentric zoom lens at the extreme short-focus position.
Figure 16D:
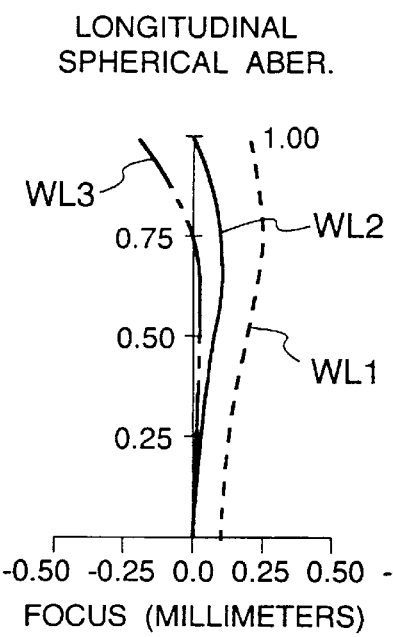
FIG. 16D illustrates spherical aberration in the second telecentric zoom lens at the extreme long-focus position.
Figure 16E:
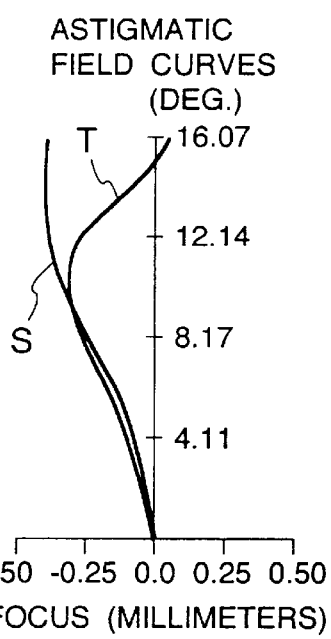
FIG. 16E illustrates astigmatism in the second telecentric zoom lens at the extreme long-focus position.
Figure 16F:
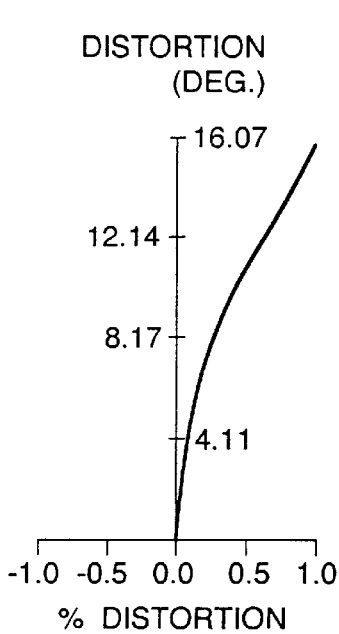
FIG. 16F illustrates distortion in the second telecentric zoom lens at the extreme long-focus position.
Figure 17A:
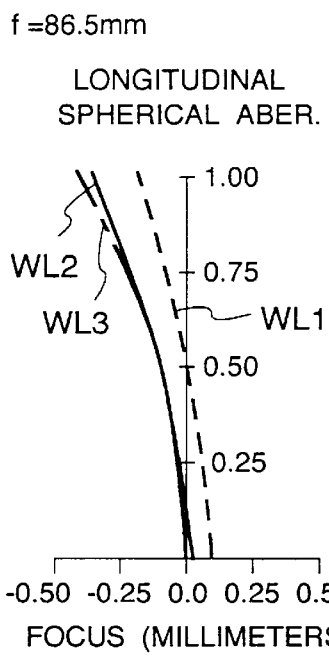
FIG. 17A illustrates spherical aberration in a third telecentric zoom lens at the extreme short-focus position.
Figure 17B:
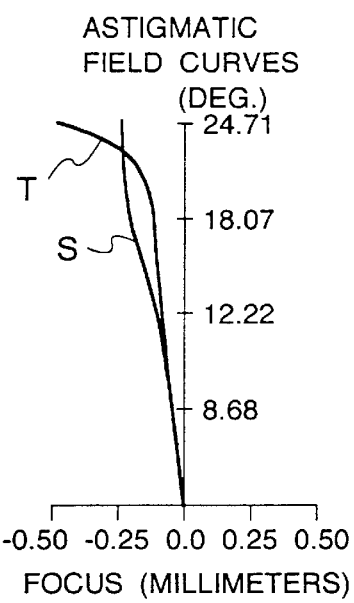
FIG. 17B illustrates astigmatism in the third telecentric zoom lens at the extreme short-focus position.
Figure 17C:
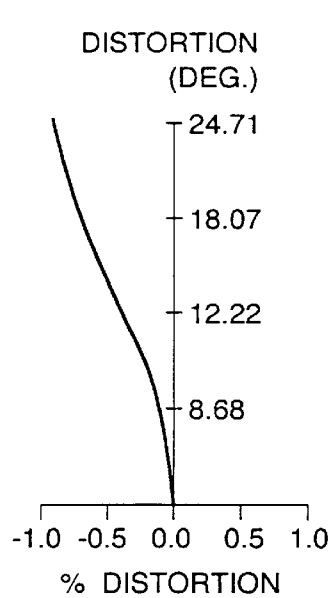
FIG. 17C illustrates distortion in the third telecentric zoom lens at the extreme short-focus position.
Figure 17D:
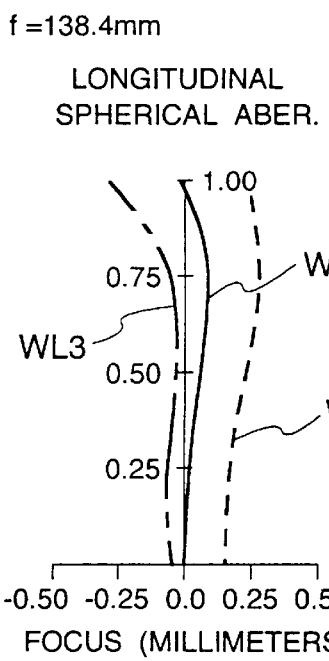
FIG. 17D illustrates spherical aberration in the third telecentric zoom lens at the extreme long-focus position.
Figure 17E:
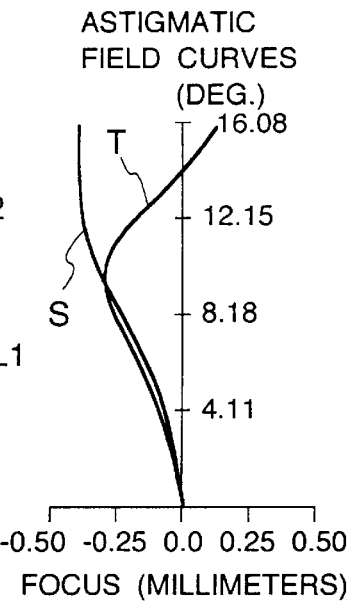
FIG. 17E illustrates astigmatism in the third telecentric zoom lens at the extreme long-focus position.
Figure 17F:
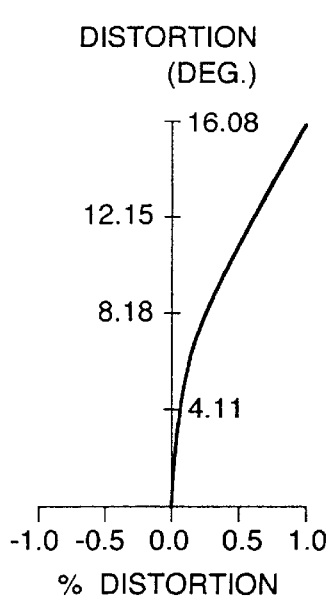
FIG. 17F illustrates distortion in the third telecentric zoom lens at the extreme long-focus position.
Figure 18A:
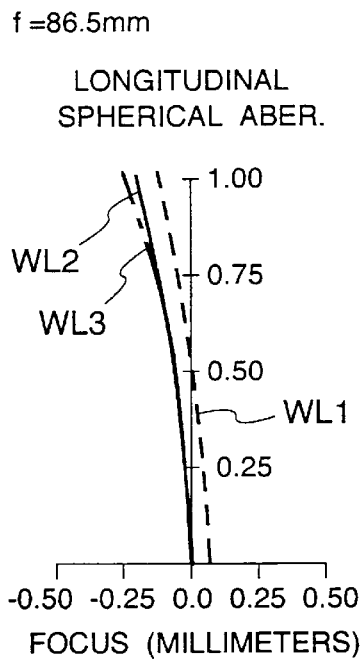
FIG. 18A illustrates spherical aberration in a fourth telecentric zoom lens at the extreme short-focus position.
Figure 18B:
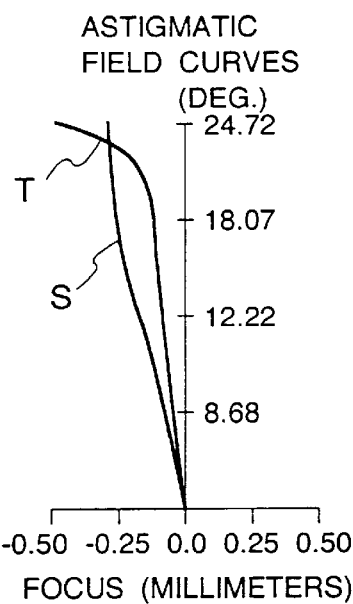
FIG. 18B illustrates astigmatism in the fourth telecentric zoom lens at the extreme short-focus position.
Figure 18C:
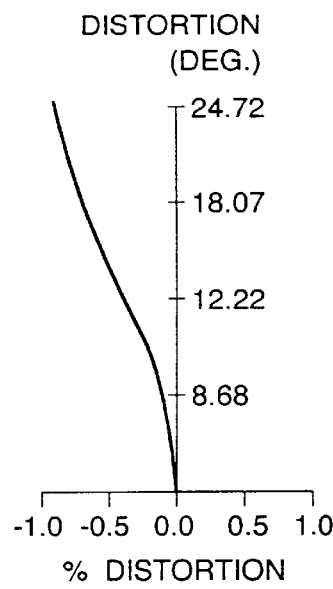
FIG. 18C illustrates distortion in the fourth telecentric zoom lens at the extreme short-focus position.
Figure 18D:
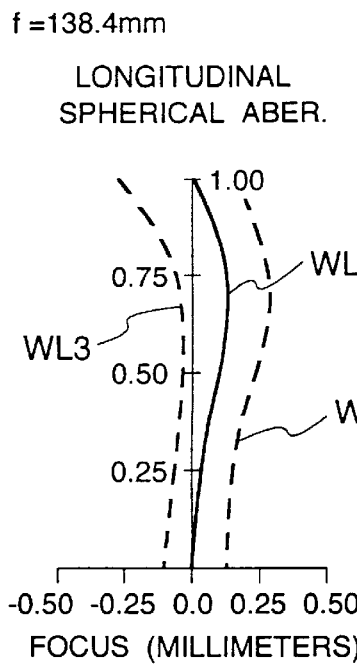
FIG. 18D illustrates spherical aberration in the fourth telecentric zoom lens at the extreme long-focus position.
Figure 18E:
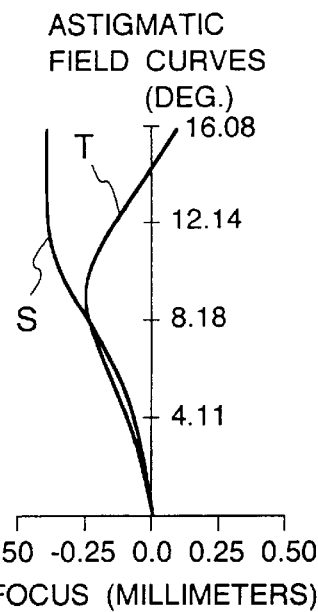
FIG. 18E illustrates astigmatism in the fourth telecentric zoom lens at the extreme long-focus position.
Figure 18F:
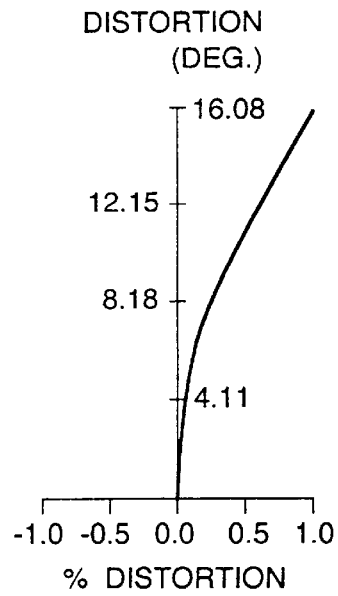
FIG. 18F illustrates distortion in the fourth telecentric zoom lens at the extreme long-focus position.

FIGS. 15D, 15E, and 15F show corresponding aberration characteristics when the second lens group 62 is at the extreme long-focus position (f=138.4 mm). As can be seen from FIGS. 15A to 15F, aberration is well controlled at both the short- and long-focus positions.

FIGS. 16A to 16F show similar characteristics for a second telecentric zoom lens, described in Table 3. FIGS. 17A to 17F show similar characteristics for a third telecentric zoom lens, described in Table 4. FIGS. 18A to 18F show similar characteristics for a fourth telecentric zoom lens, described in Table 5. Generally similar aberration control is achieved in all four of these novel telecentric zoom lenses.

Figure 19:
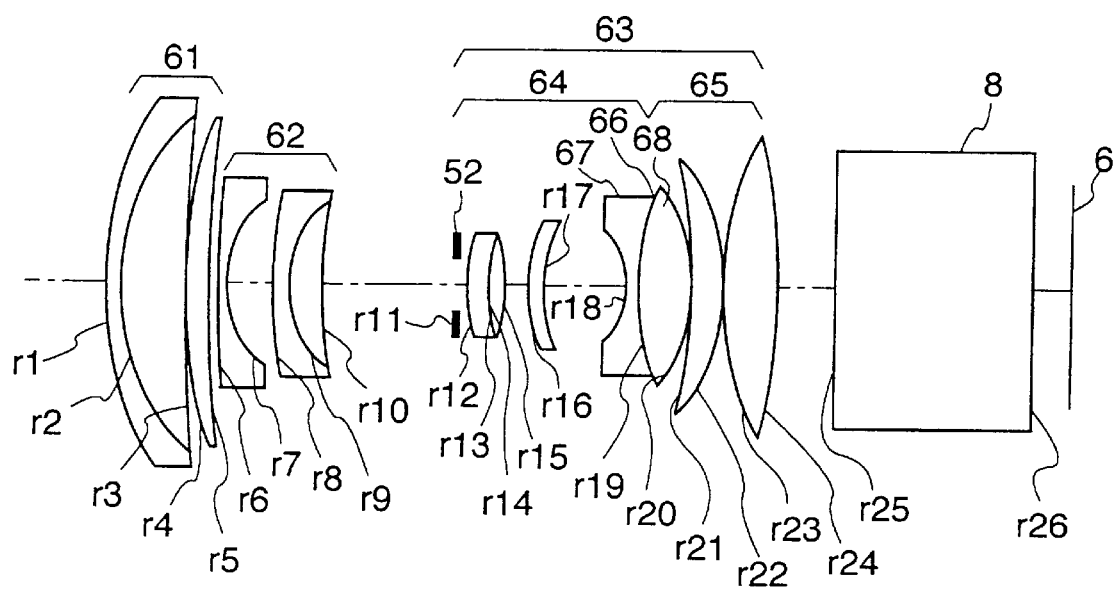
FIG. 19 is a sectional view of another novel telecentric zoom lens configuration, sample aberration characteristics for which are shown in FIGS. 20A to 20F.
Figure 20A:
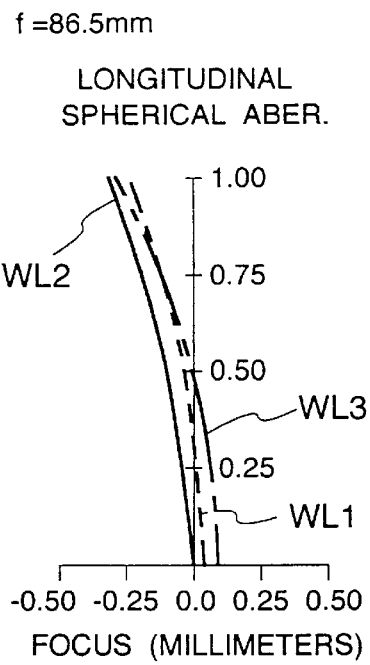
FIG. 20A illustrates spherical aberration in a fifth telecentric zoom lens at the extreme short-focus position.
Figure 20B:
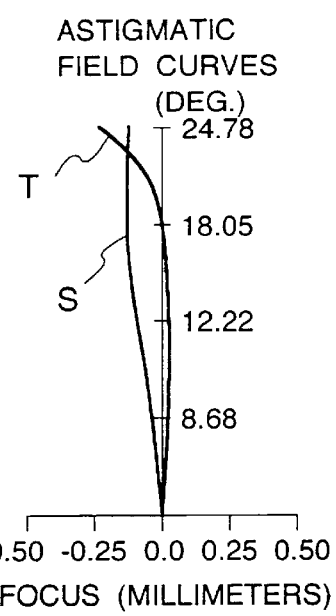
FIG. 20B illustrates astigmatism in the fifth telecentric zoom lens at the extreme short-focus position.
Figure 20C:
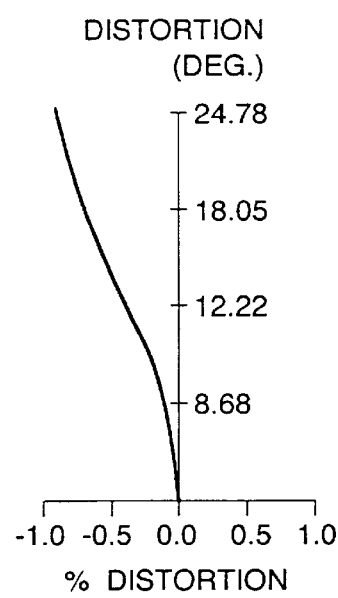
FIG. 20C illustrates distortion in the fifth telecentric zoom lens at the extreme short-focus position.
Figure 20D:
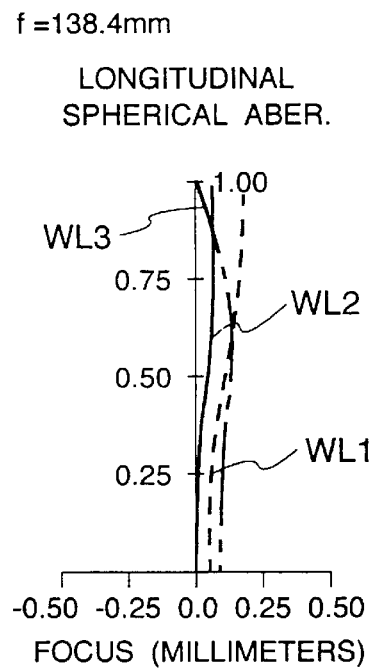
FIG. 20D illustrates spherical aberration in the fifth telecentric zoom lens at the extreme long-focus position.
Figure 20E:
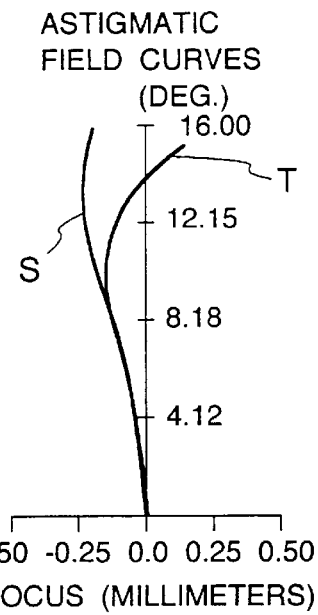
FIG. 20E illustrates astigmatism in the fifth telecentric zoom lens at the extreme long-focus position.
Figure 20F:
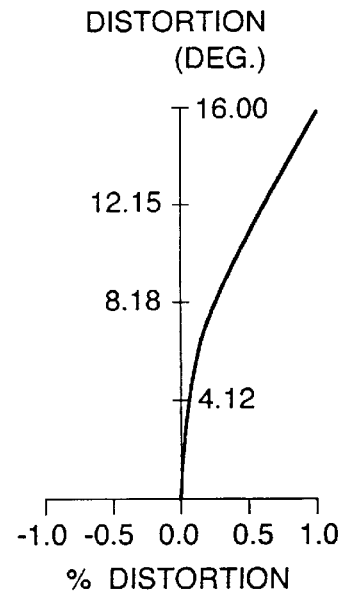
FIG. 20F illustrates distortion in the fifth telecentric zoom lens at the extreme long-focus position.

FIG. 19 shows the configuration of a fifth novel telecentric zoom lens, at the extreme short-focus position. The boundary between the fourth and fifth lens groups 64 and 65 is now at surface r19. The configurations in FIGS. 14 and 19 are substantially identical, except for the fourth lens group 64. Parameters for this fifth telecentric zoom lens are given in Table 6, and aberration characteristics are shown in FIGS. 20A to 20F.

Figure 21:
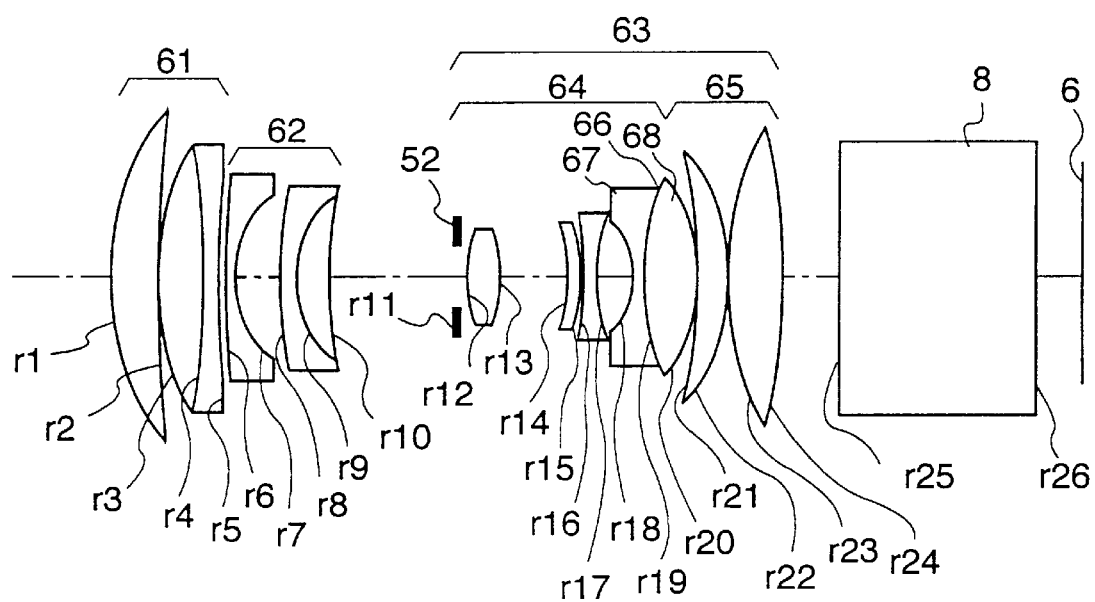
FIG. 21 is a sectional view of yet another novel telecentric zoom lens configuration, sample aberration characteristics for which are shown in FIGS. 22A to 24F.
Figure 22A:
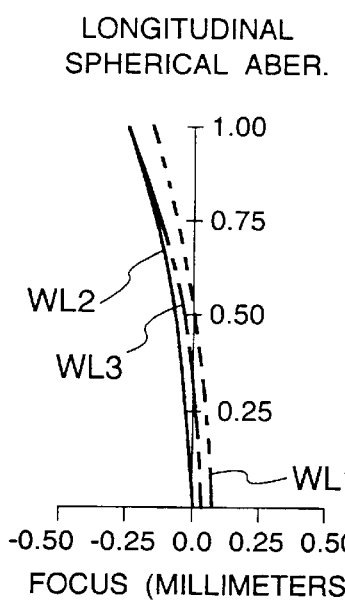
FIG. 22A illustrates spherical aberration in a sixth telecentric zoom tens at the extreme short-focus position.
Figure 22B:
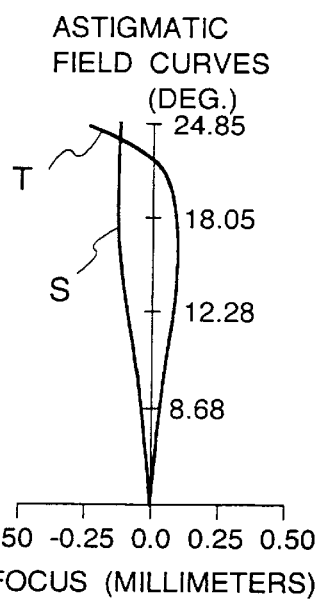
FIG. 22B illustrates astigmatism in the sixth telecentric zoom lens at the extreme short-focus position.
Figure 22C:
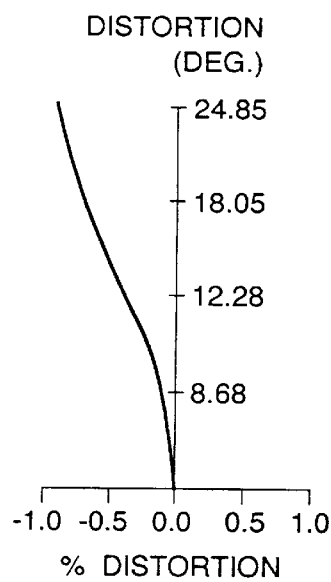
FIG. 22C illustrates distortion in the sixth telecentric zoom lens at the extreme short-focus position.
Figure 22D:
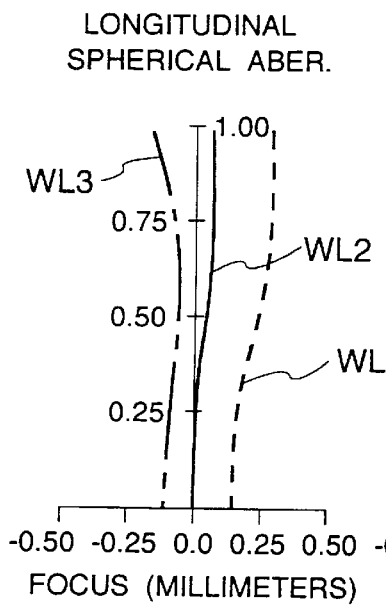
FIG. 22D illustrates spherical aberration in the sixth telecentric zoom lens at the extreme long-focus position.
Figure 22E:
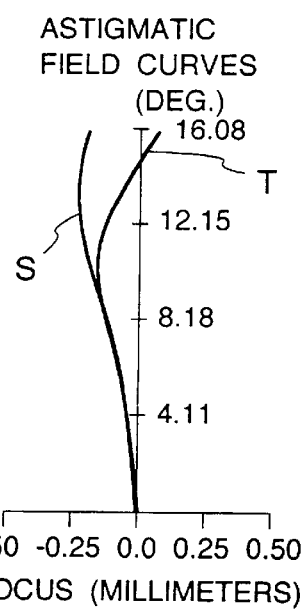
FIG. 22E illustrates astigmatism in the sixth telecentric zoom lens at the extreme long-focus position.
Figure 22F:
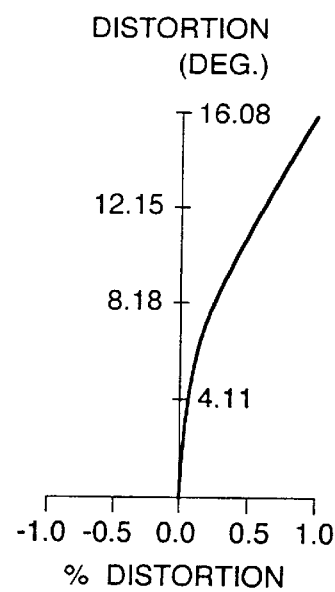
FIG. 22F illustrates distortion in the sixth telecentric zoom lens at the extreme long-focus position.
Figure 23A:
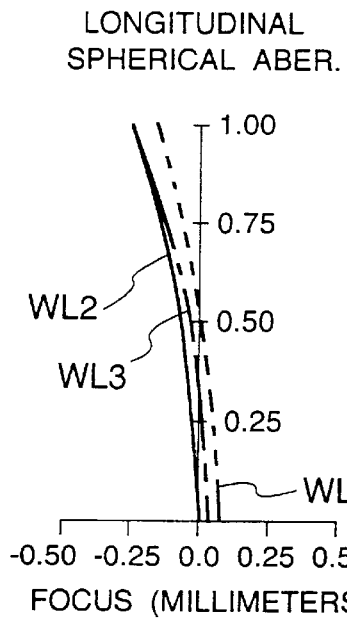
FIG. 23A illustrates spherical aberration in a seventh telecentric zoom lens at the extreme short-focus position.
Figure 23B:
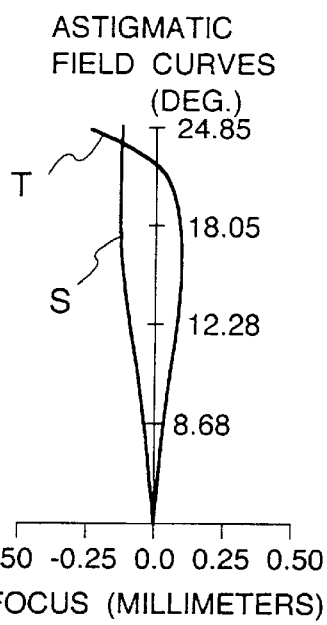
FIG. 23B illustrates astigmatism in the seventh telecentric zoom lens at the extreme short-focus position.
Figure 23C:
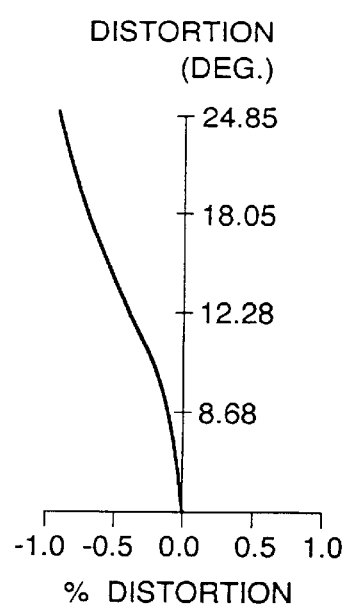
FIG. 23C illustrates distortion in the seventh telecentric zoom lens at the extreme short-focus position.
Figure 23D:
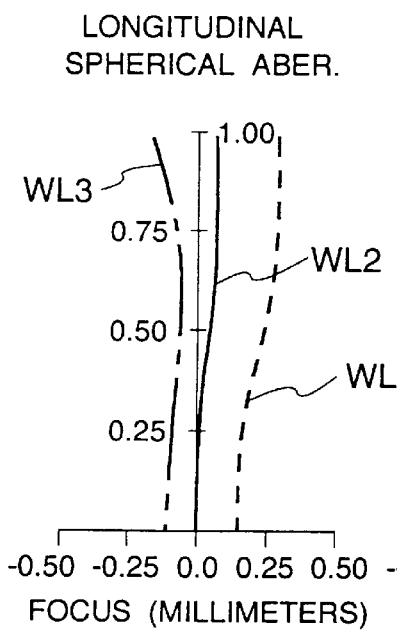
FIG. 23D illustrates spherical aberration in the seventh telecentric zoom lens at the extreme long-focus position.
Figure 23E:
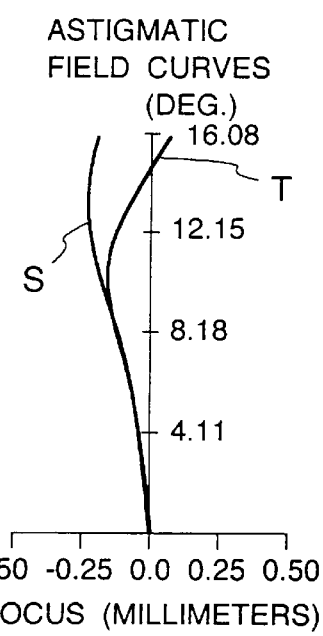
FIG. 23E illustrates astigmatism in the seventh telecentric zoom lens at the extreme long-focus position.
Figure 23F:
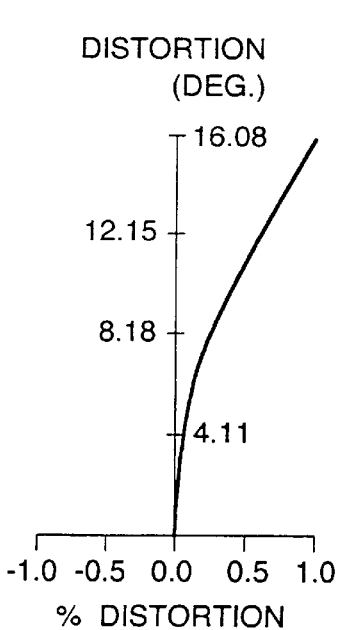
FIG. 23F illustrates distortion in the seventh telecentric zoom lens at the extreme long-focus position.
Figure 24A:
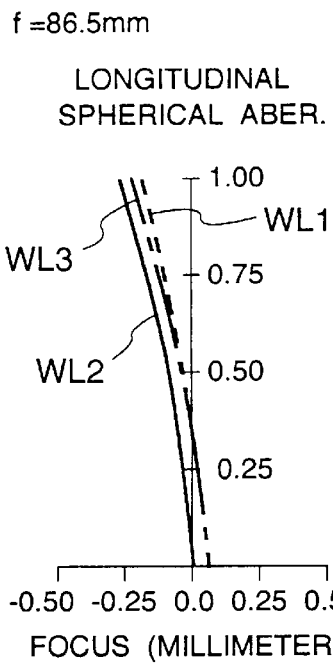
FIG. 24A illustrates spherical aberration in an eighth telecentric zoom lens at the extreme short-focus position.
Figure 24B:
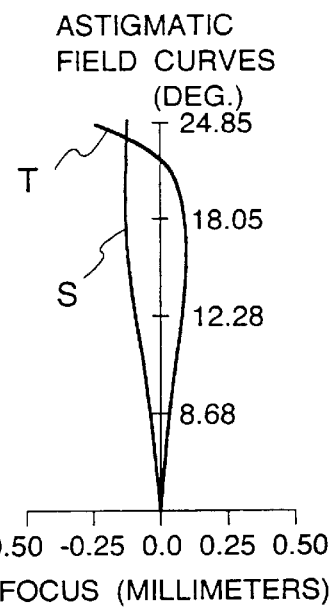
FIG. 24B illustrates astigmatism in the eighth telecentric zoom lens at the extreme short-focus position.
Figure 24C:
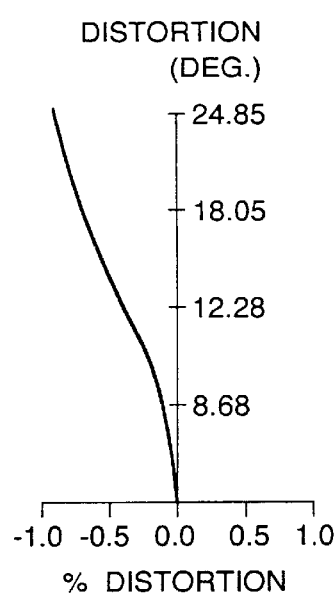
FIG. 24C illustrates distortion in the eighth telecentric zoom lens at the extreme short-focus position.
Figure 24D:
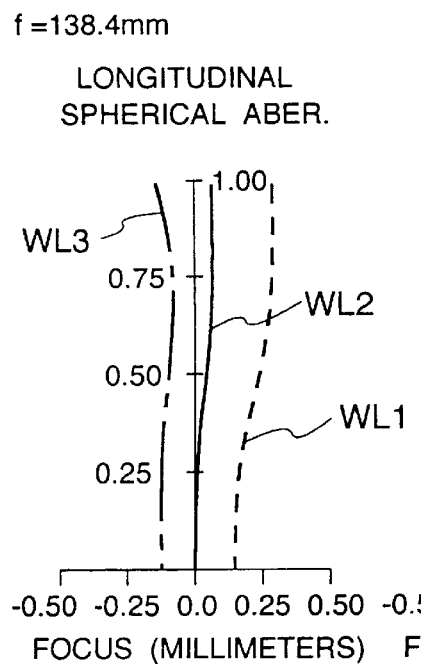
FIG. 24D illustrates spherical aberration in the eighth telecentric zoom lens at the extreme long-focus position.
Figure 24E:
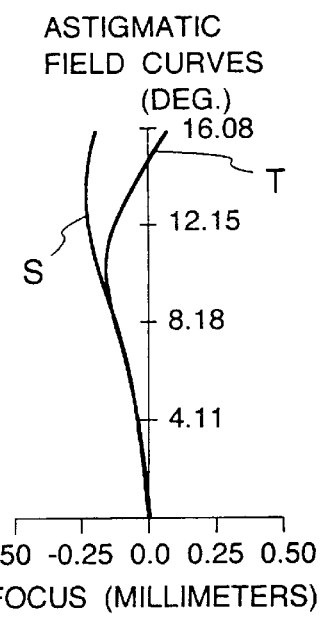
FIG. 24E illustrates astigmatism in the eighth telecentric zoom lens at the extreme long-focus position.
Figure 24F:
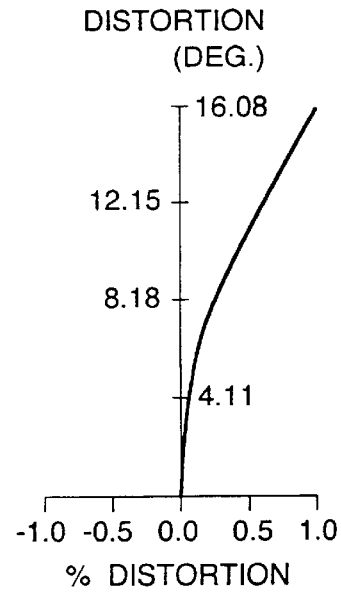
FIG. 24F illustrates distortion in the eighth telecentric zoom lens at the extreme long-focus position.

FIG. 21 shows another novel telecentric zoom lens configuration, differing from FIG. 14 in the structure of its first and fourth lens groups 61 and 64. Tables 7 to 9 list the parameters of three telecentric zoom lenses (the sixth to eighth) having the configuration in FIG. 21. FIGS. 22A to 22F show aberration characteristics of the sixth telecentric zoom lens. FIGS. 23A to 23F show aberration characteristics of the seventh telecentric zoom lens. FIGS. 24A to 24F show aberration characteristics of the eighth telecentric zoom lens.

Figure 25:
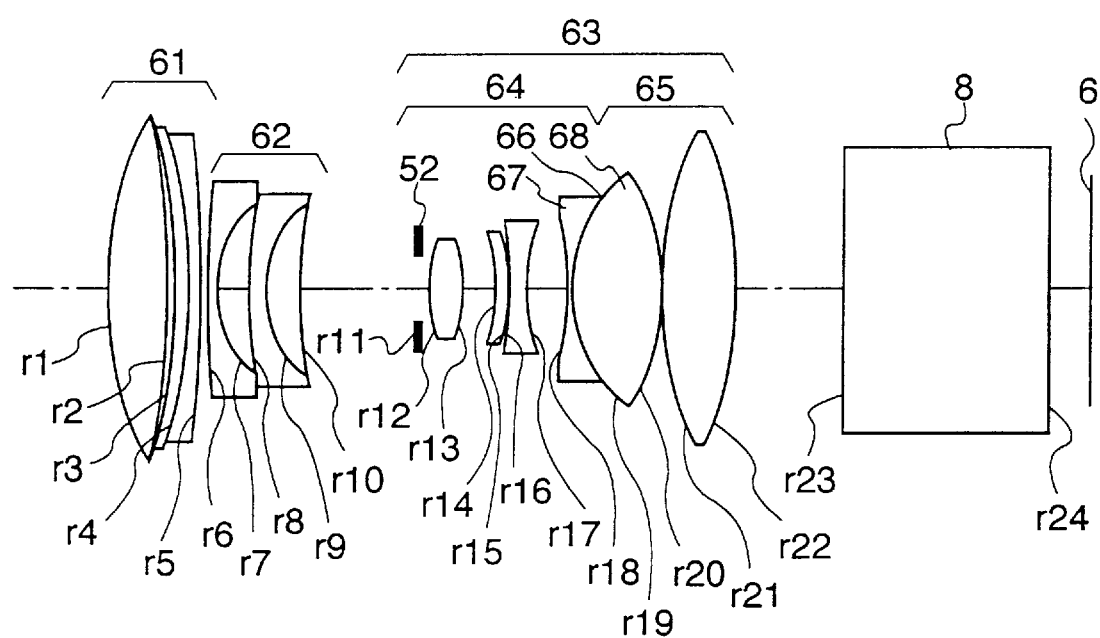
FIG. 25 is a sectional view of still another novel telecentric zoom lens configuration, sample aberration characteristics for which are shown in FIGS. 26A to 27F.
Figure 26A:
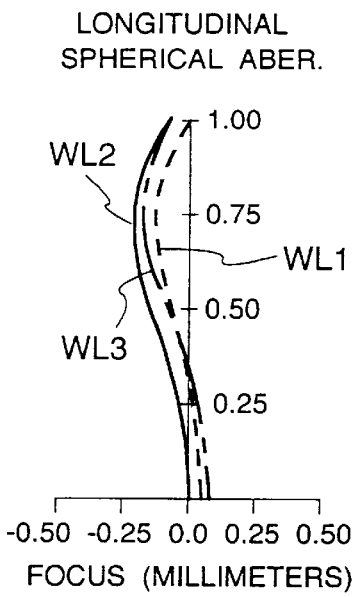
FIG. 26A illustrates spherical aberration in a ninth telecentric zoom lens at the extreme short-focus position.
Figure 26B:
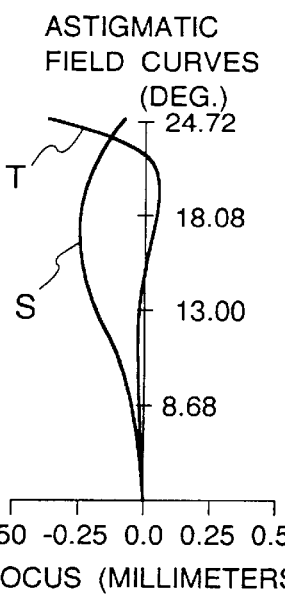
FIG. 26B illustrates astigmatism in the ninth telecentric zoom lens at the extreme short-focus position.
Figure 26C:
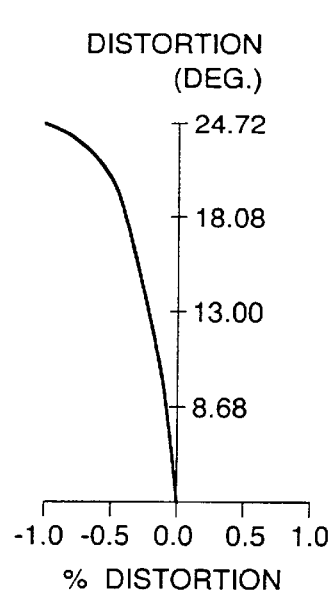
FIG. 26C illustrates distortion in the ninth telecentric zoom lens at the extreme short-focus position.
Figure 26D:
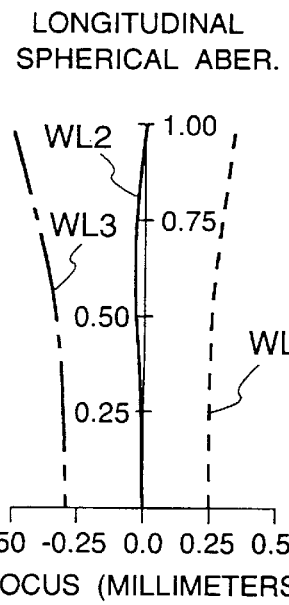
FIG. 26D illustrates spherical aberration in the ninth telecentric zoom lens at the extreme long-focus position.
Figure 26E:
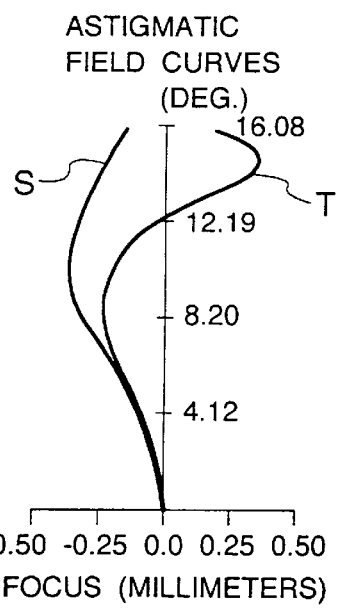
FIG. 26E illustrates astigmatism in the ninth telecentric zoom lens at the extreme long-focus position.
Figure 26F:
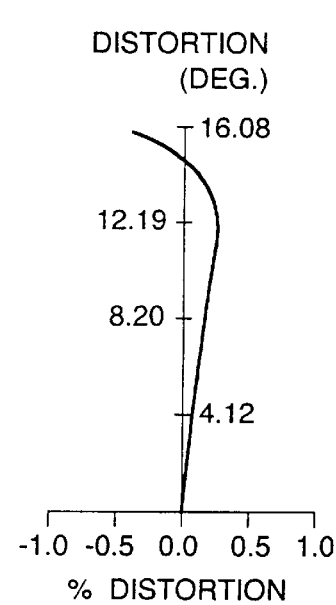
FIG. 26F illustrates distortion in the ninth telecentric zoom lens at the extreme long-focus position.
Figure 27A:
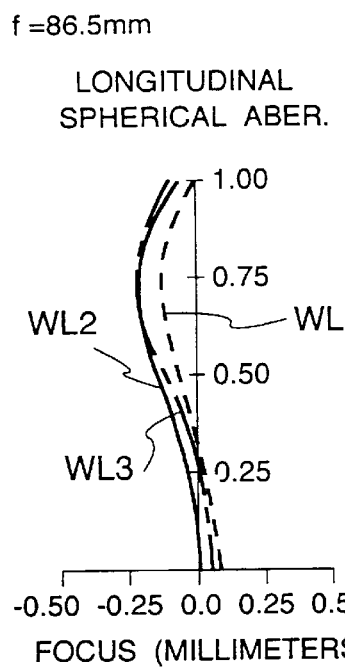
FIG. 27A illustrates spherical aberration in a tenth telecentric zoom lens at the extreme short-focus position.
Figure 27B:
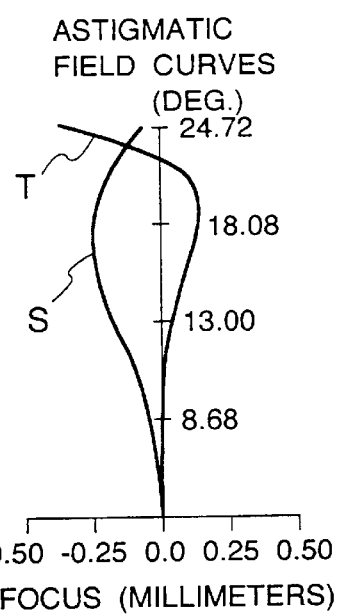
FIG. 27B illustrates astigmatism in the tenth telecentric zoom lens at the extreme short-focus position.
Figure 27C:
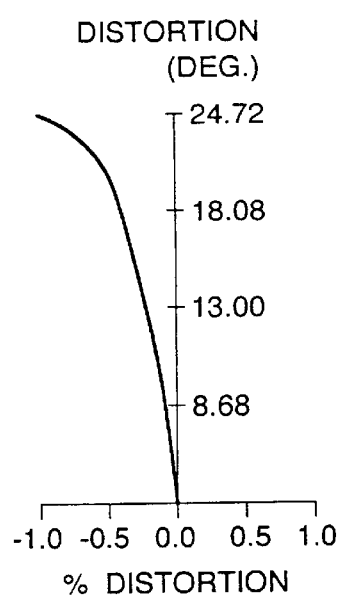
FIG. 27C illustrates distortion in the tenth telecentric zoom lens at the extreme short-focus position.
Figure 27D:
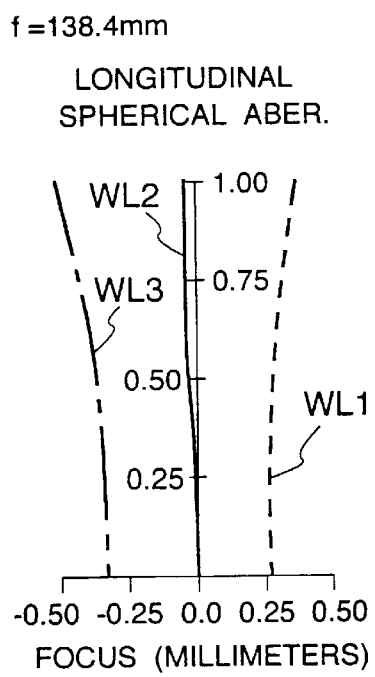
FIG. 27D illustrates spherical aberration in the tenth telecentric zoom lens at the extreme long-focus position.
Figure 27E:
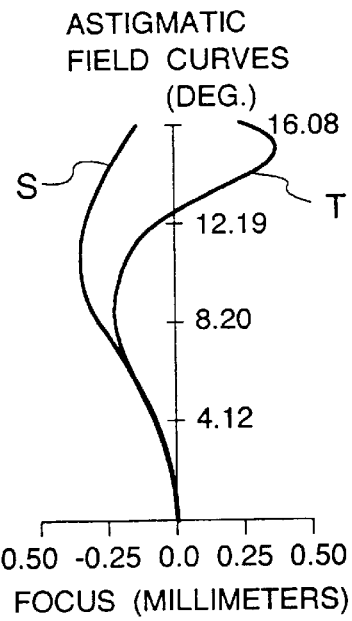
FIG. 27E illustrates astigmatism in the tenth telecentric zoom lens at the extreme long-focus position.
Figure 27F:
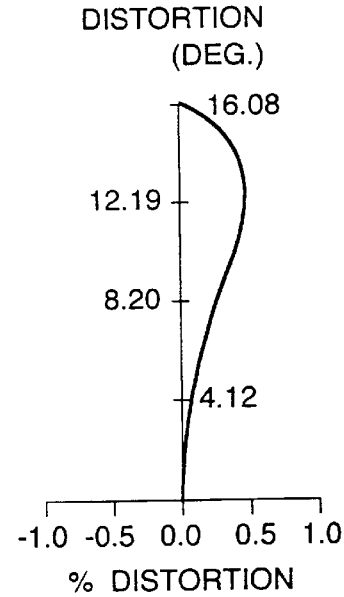
FIG. 27F illustrates distortion in the tenth telecentric zoom lens at the extreme long-focus position.

FIG. 25 shows yet another novel telecentric zoom lens configuration, differing from FIG. 21 in the structure of the first and fifth lens groups 61 and 65. Tables 10 and 11 list the parameters of a ninth and a tenth telecentric zoom lens having the configuration in FIG. 25. Aberration characteristics of these two lenses are shown in FIGS. 26A to 26F and 27A to 27F, respectively.

Table 12 lists the parameters of an eleventh novel telecentric zoom lens. The second and third lens groups, comprising surfaces r4 to r20, are similar to the corresponding lens groups in FIG. 25, where they comprise surfaces r6 to r22. The first lens group, comprising surfaces r1 to r3 in Table 12, consists of a bi-convex lens cemented to a bi-concave lens. Aberration characteristics of this telecentric zoom lens are shown in FIGS. 28A to 28F.

TABLE 2

First Telecentric Zoom Lens f = 86.50 to 138.40          F = 3.5
ω = 49.4° to 31.9°           M = 32.3 to 20.6
a = 3.00 to 45.90            b = 50.30 to 7.39
$f_1/f_w$ = 2.5234           $f_2/f_w$ = −1.0923
$f_3/f_w$ = 1.2179           $L_{23w}/f_w$ = 0.6046
$\Delta/f_3$ = 0.106         $f_{31}/f_{32}$ = −11.5

| m | ri | di | ni | νi | |
|---|---|---|---|---|---|
| 1 | 125.67353 | 2.80 | 1.784715 | 25.70 | |
| 2 | 84.57319 | 25.46 | 1.516798 | 64.20 | |
| 3 | 411.91267 | 0.30 | | | |
| 4 | 187.07677 | 9.94 | 1.712999 | 53.94 | |
| 5 | 698.05516 | a | | | |
| 6 | 204.60959 | 2.80 | 1.743299 | 49.22 | |
| 7 | 43.21994 | 19.71 | | | |
| 8 | 268.74804 | 2.80 | 1.516798 | 64.20 | |
| 9 | 40.15751 | 12.00 | 1.806104 | 40.73 | |
| 10 | 119.04194 | b | | | |
| 11 | Infinity | 2.00 | | | AST |
| 12 | 44.19456 | 10.00 | 1.784715 | 25.70 | |
| 13 | 48.27936 | 2.00 | | | |
| 14 | 69.23705 | 8.00 | 1.603110 | 60.69 | |
| 15 | −9189.64273 | 33.93 | | | |
| 16 | −30.76288 | 2.80 | 1.784715 | 25.70 | |
| 17 | 123.93487 | 21.56 | 1.516798 | 64.20 | |
| 18 | −52.11647 | 0.30 | | | |
| 19 | −240.81505 | 11.00 | 1.785896 | 43.93 | |
| 20 | −86.34464 | 0.30 | | | |
| 21 | 145.48974 | 19.00 | 1.743299 | 49.22 | |
| 22 | −237.66236 | 24.41 | | | |
| 23 | Infinity | 71.00 | 1.516798 | 64.20 | PLATE |
| 24 | Infinity | | | | |

TABLE 3

Second Telecentric Zoom Lens f = 86.50 to 138.39          F = 3.5
ω = 49.4° to 31.9°           M = 32.3 to 20.6
a = 3.00 to 46.81            b = 51.17 to 7.35
$f_1/f_w$ = 2.5681           $f_2/f_w$ = −1.1161
$f_3/f_2$ = 1.2185           $L_{23w}/f_w$ = 0.6147
$\Delta/f_3$ = 0.104         $f_{31}/f_{32}$ = −10.3

| m | ri | di | ni | νi | |
|---|---|---|---|---|---|
| 1 | 124.07478 | 2.80 | 1.784715 | 25.70 | |
| 2 | 85.78888 | 26.24 | 1.516798 | 64.20 | |
| 3 | 582.14053 | 0.30 | | | |
| 4 | 198.86457 | 8.39 | 1.712999 | 53.94 | |
| 5 | 515.73652 | a | | | |
| 6 | 207.39088 | 2.80 | 1.743299 | 49.22 | |
| 7 | 43.50468 | 19.11 | | | |
| 8 | 318.52869 | 2.80 | 1.516798 | 64.20 | |
| 9 | 40.56893 | 12.00 | 1.806104 | 40.73 | |
| 10 | 129.02090 | b | | | |
| 11 | Infinity | 2.00 | | | AST |
| 12 | 44.51727 | 10.00 | 1.784715 | 25.70 | |
| 13 | 47.09149 | 2.00 | | | |
| 14 | 68.44778 | 8.00 | 1.638542 | 55.45 | |
| 15 | 1545.82345 | 34.38 | | | |
| 16 | −31.80698 | 2.80 | 1.784715 | 25.70 | |
| 17 | 125.65955 | 21.62 | 1.516798 | 64.20 | |
| 18 | −52.10327 | 0.30 | | | |
| 19 | −230.42573 | 11.00 | 1.719998 | 50.34 | |
| 20 | −83.47437 | 0.30 | | | |
| 21 | 145.60257 | 19.00 | 1.785896 | 43.93 | |
| 22 | −270.49843 | 25.08 | | | |
| 23 | Infinity | 71.00 | 1.516798 | 64.20 | PLATE |
| 24 | Infinity | | | | |

TABLE 4

Third Telecentric Zoom Lens f = 86.50 to 138.40          F = 3.5
ω = 49.4° to 32.0°           M = 32.3 to 20.6
a = 3.00 to 42.86            b = 47.57 to 7.69
$f_1/f_w$ = 2.3741           $f_2/f_w$ = −1.0151
$f_3/f_w$ = 1.2274           $L_{23w}/f_w$ = 0.5730
$\Delta/f_3$ = 0.095         $f_{31}/f_{32}$ = −11.4

| m | ri | di | ni | νi | |
|---|---|---|---|---|---|
| 1 | 132.29455 | 3.00 | 1.784715 | 25.70 | |
| 2 | 88.35353 | 25.48 | 1.516798 | 64.20 | |
| 3 | 632.70478 | 0.30 | | | |
| 4 | 160.49160 | 9.95 | 1.719998 | 50.34 | |
| 5 | 429.33397 | a | | | |
| 6 | 206.68261 | 3.00 | 1.743299 | 49.22 | |
| 7 | 41.98060 | 20.29 | | | |
| 8 | 274.21895 | 3.00 | 1.518233 | 58.96 | |
| 9 | 39.60209 | 12.00 | 1.806099 | 33.27 | |
| 10 | 114.44343 | b | | | |
| 11 | Infinity | 2.00 | | | AST |
| 12 | 48.51684 | 10.00 | 1.743299 | 49.22 | |
| 13 | 65.60146 | 2.00 | | | |
| 14 | 158.42928 | 8.00 | 1.696802 | 55.46 | |
| 15 | −301.01477 | 34.82 | | | |
| 16 | −31.73440 | 3.00 | 1.784715 | 25.70 | |
| 17 | 130.13888 | 21.99 | 1.516798 | 64.20 | |
| 18 | −53.05117 | 0.30 | | | |
| 19 | −213.11755 | 11.00 | 1.712999 | 53.94 | |
| 20 | −86.36616 | 0.30 | | | |
| 21 | 183.03856 | 19.00 | 1.806104 | 40.73 | |
| 22 | −189.92627 | 30.51 | | | |
| 23 | Infinity | 71.00 | 1.516798 | 64.20 | PLATE |
| 24 | Infinity | | | | |

TABLE 5

Fourth Telecentric Zoom Lens $f = 86.50$ to $138.40$  $F = 3.5$
$\omega = 49.4°$ to $32.0°$  $M = 32.3$ to $20.6$
$a = 3.00$ to $43.10$  $b = 47.55$ to $7.45$
$f_1/f_w = 2.3812$  $f_2/f_w = -1.0204$
$f_3/f_w = 1.2260$  $L_{23w}/f_w = 0.5729$
$\Delta/f_3 = 0.092$  $f_{31}/f_{32} = -8.0$

| m | ri | di | ni | νi |
|---|---|---|---|---|
| 1 | 133.88612 | 3.00 | 1.784715 | 25.70 |
| 2 | 89.24953 | 24.07 | 1.516798 | 64.20 |
| 3 | 547.95995 | 0.30 | | |
| 4 | 161.29463 | 10.20 | 1.719998 | 50.34 |
| 5 | 479.64046 | a | | |
| 6 | 199.10905 | 3.00 | 1.743299 | 49.22 |
| 7 | 41.66973 | 19.91 | | |
| 8 | 227.60379 | 3.00 | 1.518233 | 58.96 |
| 9 | 38.57135 | 12.00 | 1.806099 | 33.27 |
| 10 | 106.17264 | b | | |
| 11 | Infinity | 2.00 | | AST |
| 12 | 52.23919 | 10.00 | 1.751322 | 47.14 |
| 13 | 70.41211 | 2.00 | | |
| 14 | 207.55046 | 8.00 | 1.701705 | 54.52 |
| 15 | −262.13357 | 36.22 | | |
| 16 | −34.45479 | 3.00 | 1.785000 | 25.80 |
| 17 | 137.43059 | 21.90 | 1.519988 | 67.08 |
| 18 | −54.78639 | 0.30 | | |
| 19 | −204.19220 | 11.29 | 1.713000 | 53.90 |
| 20 | −86.27577 | 0.30 | | |
| 21 | 176.09439 | 18.96 | 1.806000 | 40.70 |
| 22 | −213.46466 | 33.15 | | |
| 23 | Infinity | 71.00 | 1.516798 | 64.20 PLATE |
| 24 | Infinity | | | |

TABLE 6

Fifth Telecentric Zoom Lens $f = 86.50$ to $138.40$  $F = 3.5$
$\omega = 49.4°$ to $32.0°$  $M = 32.3$ to $20.6$
$a = 3.00$ to $44.72$  $b = 49.18$ to $7.46$
$f_1/f_w = 2.4731$  $f_2/f_w = -1.0645$
$f_3/f_w = 1.2303$  $L_{23w}/f_w = 0.5917$
$\Delta/f_3 = 0.088$  $f_{31}/f_{32} = -7.0$

| m | ri | di | ni | νi |
|---|---|---|---|---|
| 1 | 118.23465 | 2.80 | 1.784715 | 25.70 |
| 2 | 81.67037 | 27.02 | 1.516798 | 64.20 |
| 3 | 617.52342 | 0.20 | | |
| 4 | 169.34983 | 7.99 | 1.719998 | 50.34 |
| 5 | 342.01528 | a | | |
| 6 | 213.56823 | 2.80 | 1.743299 | 49.22 |
| 7 | 42.62124 | 19.44 | | |
| 8 | 375.87834 | 2.80 | 1.518233 | 58.96 |
| 9 | 40.12589 | 12.00 | 1.777811 | 36.24 |
| 10 | 144.59870 | b | | |
| 11 | Infinity | 2.00 | | AST |
| 12 | 55.64841 | 10.00 | 1.803848 | 40.91 |
| 13 | 46.39936 | 1.00 | | |
| 14 | 55.35973 | 6.00 | 1.670029 | 47.25 |
| 15 | −285.48458 | 10.19 | | |
| 16 | 88.43117 | 5.00 | 1.620040 | 36.37 |
| 17 | 50.26836 | 25.80 | | |
| 18 | −34.76104 | 2.80 | 1.784715 | 25.70 |
| 19 | 439.18485 | 19.57 | 1.589128 | 61.25 |
| 20 | −53.08130 | 0.20 | | |
| 21 | −232.45781 | 13.00 | 1.696999 | 48.51 |
| 22 | −82.29081 | 0.20 | | |
| 23 | 177.87856 | 17.00 | 1.712999 | 53.94 |
| 24 | −211.11085 | 32.61 | | |
| 25 | Infinity | 71.00 | 1.516798 | 64.20 PLATE |

TABLE 6-continued

Fifth Telecentric Zoom Lens $f = 86.50$ to $138.40$  $F = 3.5$
$\omega = 49.4°$ to $32.0°$  $M = 32.3$ to $20.6$
$a = 3.00$ to $44.72$  $b = 49.18$ to $7.46$
$f_1/f_w = 2.4731$  $f_2/f_w = -1.0645$
$f_3/f_w = 1.2303$  $L_{23w}/f_w = 0.5917$
$\Delta/f_3 = 0.088$  $f_{31}/f_{32} = -7.0$

| m | ri | di | ni | νi |
|---|---|---|---|---|
| 26 | Infinity | | | |

TABLE 7

Sixth Telecentric Zoom Lens $f = 86.50$ to $138.40$  $F = 3.5$
$\omega = 49.3°$ to $32.0°$  $M = 32.3$ to $20.3$
$a = 3.00$ to $27.57$  $b = 50.13$ to $5.00$
$f_1/f_w = 1.8701$  $f_2/f_w = -0.8267$
$f_3/f_w = 1.1194$  $L_{23w}/f_w = 0.6027$
$\Delta/f_3 = 0.087$  $f_{31}/f_{32} = -7.1$

| m | ri | di | ni | νi |
|---|---|---|---|---|
| 1 | 122.68530 | 17.00 | 1.756999 | 47.71 |
| 2 | 1502.29532 | 0.30 | | |
| 3 | 140.63846 | 17.00 | 1.487489 | 70.44 |
| 4 | −333.83302 | 4.00 | 1.784715 | 25.70 |
| 5 | 315.92917 | a | | |
| 6 | 312.62512 | 2.80 | 1.712999 | 53.94 |
| 7 | 37.53981 | 15.60 | | |
| 8 | 3220.46539 | 3.00 | 1.531720 | 48.84 |
| 9 | 36.69915 | 14.91 | 1.806099 | 33.27 |
| 10 | 151.06263 | b | | |
| 11 | Infinity | 2.00 | | AST |
| 12 | 109.56427 | 10.00 | 1.638542 | 55.45 |
| 13 | −107.62461 | 21.99 | | |
| 14 | −47.44025 | 5.00 | 1.516798 | 64.20 |
| 15 | −69.52574 | 0.20 | | |
| 16 | −325.90555 | 5.00 | 1.717359 | 29.50 |
| 17 | 171.04783 | 10.87 | | |
| 18 | −74.88566 | 2.80 | 1.728251 | 28.32 |
| 19 | 110.84506 | 21.00 | 1.516798 | 64.20 |
| 20 | −75.24197 | 0.20 | | |
| 21 | −1146.60466 | 13.00 | 1.719998 | 50.34 |
| 22 | −115.01993 | 0.20 | | |
| 23 | 184.01021 | 20.00 | 1.712999 | 53.94 |
| 24 | −177.82602 | 33.39 | | |
| 25 | Infinity | 71.00 | 1.516798 | 64.20 PLATE |
| 26 | Infinity | | | |

TABLE 8

Seventh Telecentric Zoom Lens $f = 86.50$ to $138.40$  $F = 3.5$
$\omega = 49.1°$ to $31.8°$  $N = 32.3$ to $20.3$
$a = 3.00$ to $27.57$  $b = 50.28$ to $5.00$
$f_1/f_w = 1.8716$  $f_2/f_w = -0.8278$
$f_3/f_w = 1.1183$  $L_{23w}/f_w = 0.6043$
$\Delta/f_3 = 0.089$  $f_{31}/f_{32} = -7.8$

| m | ri | di | ni | νi |
|---|---|---|---|---|
| 1 | 122.19748 | 17.00 | 1.756999 | 47.71 |
| 2 | 1388.20956 | 0.30 | | |
| 3 | 140.16029 | 17.00 | 1.487489 | 70.44 |
| 4 | −339.17276 | 4.00 | 1.784715 | 25.70 |
| 5 | 313.82829 | a | | |

TABLE 8-continued

Seventh Telecentric Zoom Lens f = 86.50 to 138.40  F = 3.5
ω = 49.1° to 31.8°   N = 32.3 to 20.3
a = 3.00 to 27.57    b = 50.28 to 5.00
$f_1/f_w$ = 1.8716   $f_2/f_w$ = −0.8278
$f_3/f_w$ = 1.1183   $L_{23w}/f_w$ = 0.6043
$\Delta/f_3$ = 0.089 $f_{31}/f_{32}$ = −7.8

| m | ri | di | ni | ν i | |
|---|---|---|---|---|---|
| 6 | 304.77475 | 2.80 | 1.712999 | 53.94 | |
| 7 | 37.46640 | 15.58 | | | |
| 8 | 4784.21263 | 3.00 | 1.531720 | 48.84 | |
| 9 | 36.68044 | 14.99 | 1.806099 | 33.27 | |
| 10 | 152.41023 | b | | | |
| 11 | Infinity | 2.00 | | | AST |
| 12 | 102.60055 | 10.00 | 1.638542 | 55.45 | |
| 13 | −110.43771 | 22.39 | | | |
| 14 | −48.66046 | 5.00 | 1.518233 | 58.96 | |
| 15 | −73.40170 | 0.20 | | | |
| 16 | −259.94850 | 5.00 | 1.717359 | 29.50 | |
| 17 | 199.03510 | 10.27 | | | |
| 18 | −74.32880 | 2.80 | 1.740774 | 27.77 | |
| 19 | 108.07447 | 21.00 | 1.516798 | 64.20 | |
| 20 | −73.77760 | 0.20 | | | |
| 21 | −1099.00216 | 13.00 | 1.719998 | 50.34 | |
| 22 | −112.85365 | 0.20 | | | |
| 23 | 172.10418 | 20.00 | 1.719998 | 50.34 | |
| 24 | −193.32263 | 31.22 | | | |
| 25 | Infinity | 71.00 | 1.516798 | 64.20 | PLATE |
| 26 | Infinity | | | | |

TABLE 9

Eighth Telecentric Zoom Lens f = 86.49 to 138.39  F = 3.5
Ω = 49.4° to 32.0°   M = 32.3 to 20.6
a = 3.00 to 28.68    b = 49.74 to 5.00
$f_1/f_w$ = 1.9226   $f_2/f_w$ = −0.8441
$f_3/f_w$ = 1.1230   $L_{23w}/f_w$ = 0.5982
$\Delta/f_3$ = 0.085 $f_{31}/f_{32}$ = −6.7

| m | ri | di | ni | ν i | |
|---|---|---|---|---|---|
| 1 | 125.91041 | 17.00 | 1.757448 | 46.27 | |
| 2 | 1589.30729 | 0.30 | | | |
| 3 | 141.47938 | 17.00 | 1.491908 | 69.86 | |
| 4 | −344.90091 | 4.00 | 1.785800 | 26.17 | |
| 5 | 305.02501 | a | | | |
| 6 | 310.03760 | 2.80 | 1.713000 | 53.90 | |
| 7 | 38.68587 | 17.09 | | | |
| 8 | 657.45255 | 3.00 | 1.537897 | 49.20 | |
| 9 | 36.77636 | 13.80 | 1.796699 | 32.51 | |
| 10 | 137.03021 | b | | | |
| 11 | Infinity | 2.00 | | | AST |
| 12 | 115.03073 | 10.00 | 1.642929 | 58.40 | |
| 13 | −107.30142 | 23.17 | | | |
| 14 | −47.91319 | 5.00 | 1.517456 | 55.52 | |
| 15 | −75.07308 | 0.20 | | | |
| 16 | −243.20014 | 5.00 | 1.717570 | 28.58 | |
| 17 | 191.29753 | 9.70 | | | |
| 18 | −83.77650 | 2.80 | 1.738427 | 27.60 | |
| 19 | 116.96315 | 21.00 | 1.516438 | 67.40 | |
| 20 | −79.92047 | 0.20 | | | |
| 21 | −1192.14717 | 13.00 | 1.730598 | 50.48 | |
| 22 | −111.55991 | 0.20 | | | |
| 23 | 203.37942 | 20.00 | 1.734258 | 49.84 | |
| 24 | −174.14365 | 35.00 | | | |
| 25 | Infinity | 71.00 | 1.516798 | 64.20 | PLATE |
| 26 | Infinity | | | | |

TABLE 10

Ninth Telecentric Zoom Lens f = 86.50 to 138.40  F = 3.5
ω = 49.4° to 32.1°   M = 32.3 to 20.6
a = 3.00 to 43.07    b = 46.97 to 5.00
$f_1/f_w$ = 2.4513   $f_2/f_w$ = −1.0438
$f_3/f_w$ = 1.1915   $L_{23w}/f_w$ = 0.5656
$\Delta/f_3$ = 0.056 $f_{31}/f_{32}$ = −14.2

| m | ri | di | ni | ν i | |
|---|---|---|---|---|---|
| 1 | 129.89548 | 22.00 | 1.716997 | 47.96 | |
| 2 | −787.67881 | 2.14 | | | |
| 3 | −480.53082 | 7.00 | 1.516798 | 64.20 | |
| 4 | −255.30804 | 4.00 | 1.755198 | 27.53 | |
| 5 | −4334.86218 | a | | | |
| 6 | 130.46471 | 2.20 | 1.744001 | 44.72 | |
| 7 | 37.85.032 | 16.89 | | | |
| 8 | 713.08743 | 3.00 | 1.487489 | 70.44 | |
| 9 | 36.03515 | 12.02 | 1.749497 | 35.27 | |
| 10 | 132.91566 | b | | | |
| 11 | Infinity | 1.96 | | | AST |
| 12 | 58.54179 | 8.81 | 1.516798 | 64.20 | |
| 13 | −100.16230 | 16.39 | | | |
| 14 | −38.59435 | 4.89 | 1.516798 | 64.20 | |
| 15 | −53.95439 | 0.20 | | | |
| 16 | −236.64161 | 4.89 | 1.755198 | 27.53 | |
| 17 | 70.36245 | 18.81 | | | |
| 18 | −266.05833 | 2.00 | 1.698944 | 30.05 | |
| 19 | 75.25389 | 33.27 | 1.638542 | 55.45 | |
| 20 | −84.97013 | 0.20 | | | |
| 21 | 171.74823 | 29.36 | 1.696999 | 48.51 | |
| 22 | −138.59026 | 40.38 | | | |
| 23 | Infinity | 71.00 | 1.516798 | 64.20 | PLATE |
| 24 | Infinity | | | | |

TABLE 11

Tenth Telecentric Zoom Lens f = 86.50 to 138.40  F = 3.5
ω = 49.4° to 32.1°   M = 32.3 to 20.6
a = 3.00 to 44.62    b = 46.62 to 5.00
$f_1/f_w$ = 2.5052   $f_2/f_w$ = −1.0610
$f_3/f_w$ = 1.1915   $L_{23w}/f_w$ = 0.5615
$\Delta/f_3$ = 0.056 $f_{31}/f_{32}$ = −14.2

| m | ri | di | ni | ν 1 | |
|---|---|---|---|---|---|
| 1 | 134.01760 | 22.00 | 1.696999 | 48.51 | |
| 2 | −782.81481 | 2.00 | | | |
| 3 | −522.12329 | 7.00 | 1.581436 | 40.89 | |
| 4 | −197.14382 | 4.00 | 1.755198 | 27.53 | |
| 5 | −1732.74331 | a | | | |
| 6 | 136.44705 | 2.00 | 1.700301 | 47.84 | |
| 7 | 37.79143 | 17.60 | | | |
| 8 | 358.72478 | 3.00 | 1.487489 | 70.44 | |
| 9 | 35.30977 | 12.00 | 1.749497 | 35.27 | |
| 10 | 110.81996 | b | | | |
| 11 | Infinity | 1.96 | | | AST |
| 12 | 58.54179 | 8.81 | 1.516798 | 64.20 | |
| 13 | −100.16230 | 16.39 | | | |
| 14 | −38.59435 | 4.89 | 1.516798 | 64.20 | |
| 15 | −53.95439 | 0.20 | | | |
| 16 | −236.64161 | 4.89 | 1.755198 | 27.53 | |
| 17 | 70.36245 | 18.81 | | | |
| 18 | −266.05833 | 2.00 | 1.698944 | 30.05 | |
| 19 | 75.25389 | 33.27 | 1.638542 | 55.45 | |
| 20 | −84.97013 | 0.20 | | | |
| 21 | 171.74823 | 29.36 | 1.696999 | 48.51 | |
| 22 | −138.59026 | 40.38 | | | |
| 23 | Infinity | 71.00 | 1.516798 | 64.20 | PLATE |
| 24 | Infinity | | | | |

TABLE 12

Eleventh Telecentric Zoom Lens

| | | | |
|---|---|---|---|
| f = 86.49 to 138.34 | | F = 3.5 | |
| ω = 49.5° to 32.1° | | M = 32.3 to 20.5 | |
| a = 2.95 to 42.64 | | b = 46.75 to 4.92 | |
| $f_1/f_w$ = 2.4820 | | $f_2/f_w$ = −1.0352 | |
| $f_3/f_w$ = 1.1452 | | $L_{23w}/f_w$ = 0.5632 | |
| $\Delta/f_3$ = 0.058 | | $f_{31}/f_{32}$ = −22.9 | |

| m | ri | di | ni | v i | |
|---|---|---|---|---|---|
| 1 | 124.38880 | 41.10 | 1.658435 | 50.85 | |
| 2 | −144.83943 | 3.00 | 1.749497 | 35.27 | |
| 3 | 6372.42127 | a | | | |
| 4 | 138.95214 | 2.87 | 1.700301 | 47.84 | |
| 5 | 36.53094 | 15.95 | | | |
| 6 | 223.22345 | 2.20 | 1.487489 | 70.44 | |
| 7 | 32.98654 | 6.57 | 1.749497 | 35.27 | |
| 8 | 96.17392 | b | | | |
| 9 | Infinity | 1.96 | | | AST |
| 10 | 56.45022 | 8.81 | 1.516798 | 64.20 | |
| 11 | −108.68959 | 16.45 | | | |
| 12 | −34.70872 | 4.89 | 1.516798 | 64.20 | |
| 13 | −43.98318 | 0.10 | | | |
| 14 | −244.33464 | 4.89 | 1.755198 | 27.53 | |
| 15 | 68.00656 | 16.58 | | | |
| 16 | −307.30774 | 2.20 | 1.698944 | 30.05 | |
| 17 | 68.83636 | 33.27 | 1.638542 | 55.45 | |
| 18 | −86.25807 | 0.10 | | | |
| 19 | 166.87500 | 29.36 | 1.696999 | 48.51 | |
| 20 | −131.84891 | 34.18 | | | |
| 21 | Infinity | 71.00 | 1.516798 | 64.20 | PLATE |
| 22 | Infinity | | | | |

The telecentric zoom lenses described above can project a sharp, high-resolution image onto a large screen in a short projection distance, with low distortion and little chromatic aberration. Employed with red, green, and blue light valves 6R, 6G, and 6B, and a dichroic prism 8 as shown in FIG. 1, or a color combiner 50 as in FIG. 10, they can project a bright, full-color image with excellent color fidelity. They are suitable for use not only in the invented color stereoscopic projection apparatus, but also in non-stereoscopic color projection apparatus. Such apparatus can be structured as in FIG. 1 to 10, for example, but without the polarization switches 7R, 7G, and 7B, and with a single image signal instead of separate left-eye and right-eye signals.

The aperture stops 52 in these telecentric zoom lenses, like the aperture stops commonly employed in camera lenses, may have an adjustable aperture diameter. The effective F-number of the lens can then be varied to adjust the brightness of the image on the screen. Moreover, a polymer-dispersion-type liquid crystal (PDLC) or dynamic-scattering-mode liquid crystal (DSM-LC) can be used in the light valves 6R, 6G, and 6B to achieve both brightness and contrast control.

The invention can also be practiced in a monochromatic stereoscopic image projection apparatus, by omitting light valves 6R and 6B and polarization switches 7R and 7B in FIG. 1 or 10, for example. The color separator 2 and dichroic prism 8 or color combiner 50 then also become unnecessary, and the remaining single light valve and polarization switch can be placed closer to the projection lens 11.

The polarizers 21 and 22 in FIG. 2 need not be crossed. For example, parallel polarizers may be used; the liquid-crystal panel then operates in the same way, except that light and dark are reversed.

Moreover, the second polarizer 22 (the analyzer) may be omitted, making the projected image visible only to a person wearing polarizing eyeglasses. The raster images produced by the light valves may thus have uniform intensity and be modulated in polarization, instead of having uniform two polarizations and being modulated in intensity as described in the first embodiment.

The voltages applied to the polarization switch depend on the type of device employed and are not limited to the positive and negative or zero and non-zero voltages indicated in the drawings.

Those skilled in the art will recognize that the stereoscopic image projection apparatus and telecentric zoom lenses described above can be modified in various further ways without departing from the scope of the invention as claimed below.

What is claimed is:

1. A projection apparatus for projecting a stereo image pair in which a first-eye image with a first type of linear polarization is combined with a second-eye image with a second type of linear polarization, comprising:

a light source for emitting light including monochromatic light corresponding to a primary color;

at least one light valve receiving said monochromatic light, electrically controlled by drive signals converted from interlaced first-eye image rasters of a first image signal to be displayed and second-eye image rasters of a second image signal to be displayed, for polarizing and modulating light intensity of said monochromatic light to alternately output intensity-modulated first and second raster image fields having uniform polarization of said first type of linear polarization, in which odd-numbered rasters in said first raster image field are modulated by said first image signal and even-numbered rasters in said first raster image field are modulated by said second image signal, and even-numbered rasters in said second raster image field are modulated by said first image signal and odd-numbered rasters in said second raster image field are modulated by said second image signal to produce a polarized raster image including a polarized first-eye image and an identically polarized second-eye image of said first type of linear polarization on alternating rasters in each of said first and second raster image fields;

a polarization switch disposed adjacent each of said light valves, for receiving said polarized raster image, changing the polarization of only even-numbered rasters modulated by said second image signal in said first field and changing the polarization of only odd-numbered rasters modulated by said second image signal in said second field, thereby creating a stereo image pair corresponding to said primary color, said stereo image pair including a polarized first-eye image of said first type of linear polarization and a differently polarized second-eye image of said second type of linear polarization on alternating rasters in each of said first and second raster image fields; and projecting means disposed between said polarization switch and a screen, for projecting said stereo image pair onto said screen.

2. The projection apparatus of claim 1, wherein said light valve comprises:

a pair of polarizers; and a liquid-crystal cell disposed between said pair of polarizers.

3. The projection apparatus of claim 2, wherein said liquid-crystal cell is a twisted nematic liquid-crystal cell.

4. The projection apparatus of claim 1, wherein each of said rasters alternates between modulation by said first image signal and modulation by said second image signal.

5. The projection apparatus of claim 1, wherein said polarization switch comprises:
  a pair of transparent plates;
  a ferroelectric liquid crystal disposed between said transparent plates; and
  a plurality of transparent electrodes disposed on at least one of said transparent plates in positions corresponding to the rasters of said raster image.

6. The projection apparatus of claim 1, wherein said polarization switch comprises:
  a pair of transparent plates;
  a nematic liquid crystal disposed between said transparent plates; and
  a plurality of transparent electrodes disposed on at least one of said transparent plates in positions corresponding to the rasters of said raster image.

7. The projection apparatus of claim 1, wherein said projection means is telecentric lens.

8. The projection apparatus of claim 7, wherein:
  said light valve has first electrodes defining said rasters, for controlling modulation of said light;
  said polarization switch has second electrodes disposed parallel to said first electrodes, for controlling polarization switching; and
  said first electrodes and said second electrodes have identical cycle of repetition.

9. The projection apparatus of claim 7, wherein said projection lens is a zoom lens comprising:
  a first lens group having positive refracting power;
  a third lens group, also having positive refracting power, disposed at a fixed distance from said first lens group;
  a second lens group having negative refracting power, movably mounted between said first lens group and said third lens group; and
  an aperture stop disposed near a paraxial focus of said third lens group, between said second lens group and said third lens group.

10. The projection apparatus of claim 1, wherein said projection means is non-telecentric lens.

11. The projection apparatus of claim 10, wherein:
  said projection lens has an entrance pupil;
  said light valve is disposed at a first distance from said entrance pupil;
  said polarization switch is disposed at a second distance from said entrance pupil;
  said light valve has first electrodes defining said rasters, spaced at a first electrode pitch, for controlling modulation of said light;
  said polarization switch has second electrodes, disposed parallel to said first electrodes and spaced at a second electrode pitch, for controlling polarization switching; and
  said first electrode pitch is to said second electrode pitch as said first distance is to said second distance.

12. The projection apparatus of claim 1, wherein said light valve and said polarization switch are in mutual contact.

13. The projection apparatus of claim 12, wherein said light valve and said polarization switch are formed as a unitary structure.

14. The projection apparatus of claim 1, comprising a quarter-wave plate for converting linear polarization of said stereo image pair to circular polarization.

15. The projection apparatus of claim 1, comprising:
  a color separator for separating the light emitted by said light source into three primary colors;
  three light valves as described in claim 1, for modulating light of respective primary colors, thereby creating respective raster images in said three primary colors;
  three polarization switches as described in claim 1, for receiving respective raster images in said three primary colors and producing respective stereoscopic images in said three primary colors; and
  an image combining means for combining said stereoscopic images in said three primary colors into a single stereoscopic image for projection through said projection lens.

16. The projection apparatus of claim 15, wherein said image combining means comprises a dichroic prism for reflecting light of a first one of said three primary colors in a first plane, reflecting light of a second one of said three primary colors in a second plane, and transmitting light of a third one of said three primary colors.

17. The projection apparatus of claim 15, wherein said image combining means comprises:
  a first dichroic mirror for reflecting one of said three primary colors; and
  a second dichroic mirror for reflecting another one of said three primary colors.

18. A method of projecting a stereo image pair onto a screen for viewing with polarizing eyeglasses, comprising the steps of:
  (a) receiving a first image signal describing a raster image intended for viewing by one eye;
  (b) storing said first image signal in a first frame memory;
  (c) receiving a second image signal describing a raster image intended for viewing by another eye;
  (d) storing said second image signal in a second frame memory;
  (e) supplying monochromatic light to at least one light valve which polarizes and modulates said monochromatic light;
  (f) reading said first frame memory and said second frame memory a raster at a time, taking rasters alternately from said first frame memory and said second frame memory;
  (g) using the rasters thus read to control light intensity modulation of said monochromatic light by said light valve, thereby alternately outputting intensity-modulated first and second raster image fields having uniform polarization of a first type of linear polarization, said first raster image field including a polarized first-eye image produced from odd-numbered rasters modulated by said first image signal and an identically polarized second-eye image produced from even-numbered rasters modulated by said second image signal, said second raster image field including a polarized first-eye image produced from even-numbered rasters modulated by said first image signal and an identically polarized second-eye image produced from odd-numbered rasters modulated by said second image signal;
  (h) altering polarization of only even-numbered rasters modulated by said second image signal in said first raster image field and altering polarization of only odd-numbered rasters modulated by said second image signal in said second raster image field individually for each of said light valves, thereby producing a stereo image pair including a polarized first-eye image of said first type of linear polarization and a differently polarized second-eye image of a second type of linear polarization on alternating rasters in each of said first and second raster image fields; and (i) projecting said stereo image pair through a projection lens on said screen.

19. The method of claim 18, comprising the further step of passing said stereo image pair through a half-wave plate, thereby altering linear polarization to right and left circular polarization.

20. The method of claim 18, wherein said steps (a) through (h) are carried out separately for three primary colors, using three separate light valves, to produce three stereo image pairs in respective primary colors.

21. The method of claim 20, comprising the further step of combining said three stereo image pairs in respective primary colors into a single color stereoscopic image for projection through said projection lens.

22. A projection apparatus comprising:

at least one light valve receiving monochromatic light and alternately outputting intensity-modulated monochromatic first and second raster image fields with rasters having uniform linear polarization, said first and second raster image fields each including rasters modulated by a first image signal and rasters modulated by a second image signal;

a light valve driving circuit receiving said first and second image signals and converting interlaced first-eye image rasters of said first image signal and second-eye image rasters of said second image signals into drive signals which drive said light valve such that said first image signal modulates light intensity of odd-numbered rasters in said first raster image field and modulates light intensity of even-numbered rasters in said second raster image field, said second image signal modulates light intensity of even-numbered rasters in said first raster image field and modulates light intensity of odd-numbered rasters in said second raster image field, and a first-eye image produced by said first image signal and a second-eye image produced by said second image signal are displayed by alternating rasters in each of said first and second raster image fields; and a polarization switch receiving said first and second intensity-modulated monochromatic raster image fields, changing the polarization of only even-numbered rasters modulated by said second image signal in said first field, changing the polarization of only odd-numbered rasters modulated by said second image signal in said second field and outputting an intensity modulated stereo pair image with interlaced, intensity-modulated first-eye and second-eye rasters having alternating linear polarization.

23. The projection apparatus of claim 22, further comprising a quarter-wave plate for receiving said stereo pair image, converting linear polarization to circular polarization, and outputting an intensity-modulated stereo image pair with interlaced, intensity-modulated first-eye and second-eye rasters having alternating circular polarization.

* * * * *